United States Patent
Pitalúa García

(10) Patent No.: US 10,715,319 B2
(45) Date of Patent: Jul. 14, 2020

(54) METHOD AND SYSTEM FOR SPACETIME-CONSTRAINED OBLIVIOUS TRANSFER

(71) Applicant: Damián Pitalúa García, Paris (FR)

(72) Inventor: Damián Pitalúa García, Paris (FR)

(73) Assignee: UNIVERSITE PARIS DIDEROT, Paris (FR)

( * ) Notice: Subject to any disclaimer, the term of this patent is extended or adjusted under 35 U.S.C. 154(b) by 385 days.

(21) Appl. No.: 15/844,514

(22) Filed: Dec. 15, 2017

(65) Prior Publication Data

US 2018/0287788 A1   Oct. 4, 2018

Related U.S. Application Data

(60) Provisional application No. 62/435,051, filed on Dec. 15, 2016.

(51) Int. Cl.
| | | |
|---|---|---|
| *H04K 1/00* | (2006.01) | |
| *H04L 9/08* | (2006.01) | |
| *H04L 1/06* | (2006.01) | |
| *G06N 10/00* | (2019.01) | |
| *G06F 16/20* | (2019.01) | |

(52) U.S. Cl.
CPC .......... *H04L 9/0852* (2013.01); *G06N 10/00* (2019.01); *H04L 1/0618* (2013.01); *H04L 9/0858* (2013.01); *G06F 16/20* (2019.01); *H04L 2209/50* (2013.01)

(58) Field of Classification Search
CPC ... H04L 9/0852; H04L 9/0858; H04L 1/0618; H04L 2209/50; G06N 10/00; G06F 16/20
See application file for complete search history.

(56) References Cited

U.S. PATENT DOCUMENTS

| | | | | |
|---|---|---|---|---|
| 7,184,555 B2* | 2/2007 | Whaley | ................. | B82Y 10/00 380/278 |
| 8,897,449 B1* | 11/2014 | Broadbent | ............ | H04L 9/0891 380/277 |
| 2002/0106084 A1* | 8/2002 | Azuma | ................. | B82Y 10/00 380/263 |
| 2006/0045269 A1* | 3/2006 | Freedman | .............. | B82Y 10/00 380/264 |
| 2009/0012938 A1* | 1/2009 | Lloyd | ................... | G06F 16/903 |
| 2010/0094842 A1* | 4/2010 | Fattal | .................... | H04L 9/0852 707/705 |
| 2010/0150349 A1* | 6/2010 | Choi | ..................... | H04L 9/0852 380/256 |

* cited by examiner

*Primary Examiner* — Trong H Nguyen
*Assistant Examiner* — Amie C. Lin
(74) *Attorney, Agent, or Firm* — Osha Liang LLP

(57) ABSTRACT

A method for performing spacetime-constrained oblivious transfer between a party A and a party B. The method includes imposing relativistic signaling constraints on a cryptographic task of one out-of-m oblivious transfer involving parties A and B. The method further includes using quantum systems for the one-out of-m oblivious transfer. The method guarantees unconditional security of the spacetime-constrained oblivious transfer, based on the imposed relativistic signaling constraints and based on using quantum systems for the one-out of-m oblivious transfer.

20 Claims, 12 Drawing Sheets

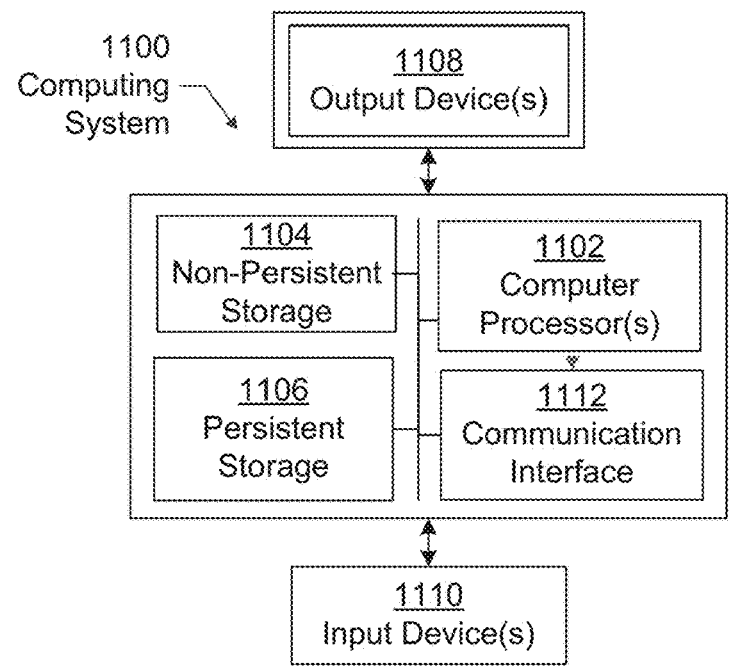
*FIG. 11.1*
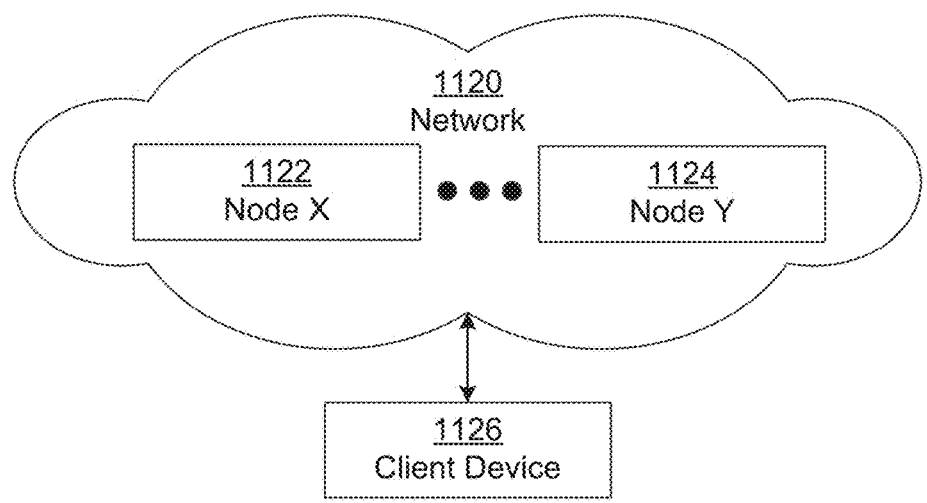
*FIG. 11.2*

METHOD AND SYSTEM FOR SPACETIME-CONSTRAINED OBLIVIOUS TRANSFER

CROSS-REFERENCE TO RELATED APPLICATIONS

This Application claims the benefit of U.S. Provisional Application 62/435,051 filed on Dec. 15, 2016 and entitled "UNCONDITIONALLY SECURE CRYPTOGRAPHIC METHOD FOR ONE-OUT-OF-M OBLIVIOUS TRANSFER BASED ON QUANTUM MECHANICS AND RELATIVISTIC CONSTRAINTS", the entire disclosure of which is hereby expressly incorporated by reference herein.

BACKGROUND

One-out-of-m oblivious transfer is useful in transactions between mistrustful parties A and B, where party A has a secret database with m entries and party B requests one of the m entries. Party B is guaranteed the secrecy of its choice, and party A is guaranteed that party B can only obtain one entry of its database. One-out-of-m oblivious transfer enables the implementation of other complex cryptographic tasks such as secure multi-party computation. Current implementations of one-out-of-m oblivious transfer fall into two broad categories. The first category is based on the processing and transmission of classical information. The second category relies on the processing and transmission of quantum systems. Both categories are considered non-relativistic.

The security of the first category of non-relativistic implementations of one-out-of-m oblivious transfer is based on the assumed difficulty of solving some mathematical problems, for example, the problem of finding the factors of large integer numbers. With the progressive development of more powerful computers, and better computing algorithms, solving mathematical problems that once were thought difficult may become less difficult, thereby potentially making these implementations vulnerable. The security of the second category of non-relativistic implementations of one-out-of-m oblivious transfer is based on assumptions on the quantum technologies that are accessible to the parties. With the development of better quantum technologies these implementations become vulnerable too.

SUMMARY

In general, in one aspect, one or more embodiments relate to a method for performing spacetime-constrained oblivious transfer between a party A and a party B, the method comprising: synchronizing a plurality of agents A, B, $A_i$, $B_i$ to a common reference frame F in a spacetime that is at least approximately Minkowski, wherein $i \in \{0, 1, \ldots, m-1\}$, wherein m corresponds to a cardinality of a plurality of messages $x_i$ from which spacetime-constrained oblivious transfer is to be performed, wherein agents A, $A_0$, $A_1$, ..., $A_{m-1}$ are associated with party A, and wherein agents B, $B_0$, $B_1$, ..., $B_{m-1}$ are associated with party B; specifying output spacetime regions $R_0, R_1, \ldots, R_{m-1}$, wherein no connection by a causal curve in spacetime exists for any pair of output spacetime regions selected from output spacetime regions $R_0, R_1, \ldots, R_{m-1}$; generating random numbers $r \in \Omega_{outcome}$ and $s \in \Omega_{basis}$ by agent A, wherein different elements s of the set $\Omega_{basis}$ label different orthogonal bases of a Hilbert space, and wherein, for any fixed $s \in \Omega_{basis}$, different elements r of the set $\Omega_{outcome}$ label different orthogonal quantum states $|\psi_r^s\rangle$ from the orthogonal basis labeled by s; generating the quantum state $|\psi_r^s\rangle$ of a quantum system, by agent A; transmitting the quantum state to agent B, by agent A; transmitting r and s to agent $A_i$, by agent A, wherein $i \in \{0, 1, \ldots, m-1\}$; obtaining an associated message $x_i \in \Omega_{outcome}$ by agent $A_i$, wherein $i \in \{0, 1, \ldots, m-1\}$; encoding, by agent $A_i$, $x_i$ using r to obtain an encoded $t_i$, wherein $i \in \{0, 1, \ldots, m-1\}$; transmitting, by agent $A_i$, $t_i$ and s to agent $B_i$ at a spacetime point that is in the causal past of at least one spacetime point of $R_i$ and that is not causally connected to any spacetime point of the output spacetime region $R_k$ for any $k \in \{0, 1, \ldots, m-1\}/\{i\}$, wherein $i \in \{0, 1, \ldots, m-1\}$; obtaining, by agent B, a selector input $b \in \{0, 1, \ldots, m-1\}$; forwarding, by agent B, the quantum state to agent $B_b$; measuring, by agent $B_b$, the quantum state in basis s to obtain outcome $r' \in \Omega_{outcome}$; and computing a received message $y_b \in \Omega_{outcome}$ by decoding the encoded $x_b$ using $r'$ and $t_b$, in the output spacetime region $R_b$.

In general, in one aspect, one or more embodiments relate to a system for performing spacetime-constrained oblivious transfer between a party A and a party B, the system comprising: a laboratory $L^A$, associated with party A, the laboratory $L^A$ comprising: a random number generator configured to generate random numbers $r \in \Omega_{outcome}$ and $s \in \Omega_{basis}$; a quantum state source configured to generate the quantum state $|\psi_r^s\rangle$, wherein different elements s of the set $\Omega_{basis}$ label different orthogonal bases of a Hilbert space, and wherein, for any fixed $s \in \Omega_{basis}$, different elements r of the set $\Omega_{outcome}$ label different orthogonal quantum states $|\psi_r^s\rangle$ from the orthogonal basis labeled by s; a preparation device that is communicatively connected to a laboratory $L^B$ using a quantum channel, and configured to transmit the quantum state to laboratory $L^B$; and a communication module that is communicatively connected to a plurality of laboratories $L_0^A, L_1^A, \ldots L_{m-1}^A$ using a plurality of secure classical channels, and configured to transmit r and s to the plurality of laboratories $L_0^A, L_1^A, \ldots L_{m-1}^A$; the plurality of laboratories $L_0^A, L_1^A, \ldots, L_{m-1}^A$, associated with party A, wherein each laboratory $L_i^A$, $i \in \{0, 1, \ldots, m-1\}$, comprises: a communication module that is communicatively connected to laboratory $L^A$ using one of the plurality of secure classical channels, and that is communicatively connected to a laboratory $L_i^B$ of a plurality of laboratories $L_0^B, L_1^B, \ldots, L_{m-1}^B$ using a classical channel, and wherein the communication module is configured to receive r and s; a computing device configured to: obtain a message $x_i \in \Omega_{outcome}$; and encode $x_i$ using r to obtain an encoded $t_i$; and wherein the communication module is further configured to transmit $t_i$ and s to laboratory $L_i^B$ using the classical channel; the laboratory $L^B$, associated with party B, comprising: a redirection unit that is communicatively connected to laboratory $L^A$ using the quantum channel, and configured to receive the quantum state from laboratory $L^A$; a computing device configured to obtain a selector input $b \in \{0, 1, \ldots, m-1\}$; a quantum communication module that is communicatively connected to a plurality of laboratories $L_0^B, L_1^B, \ldots L_{m-1}^B$ using a plurality of secure quantum channels, wherein the quantum communication module is configured to forward the quantum state to laboratory $L_b^B$; a laboratory $L_b^B$ of the plurality of laboratories $L_0^B, L_1^B, \ldots, L_{m-1}^B$, associated with party B, comprising: a communication module that is communicatively connected to laboratory $L_b^A$ using one of the plurality of classical channels, and configured to receive $t_b$ and s; a quantum measurement device communicatively connected to laboratory $L^B$ using one of the plurality of secure quantum channels, and configured to measure the quantum state in basis s to obtain outcome $r' \in \Omega_{outcome}$; and a computing device configured to compute a received message $y_b \in \Omega_{outcome}$ by decoding the encoded $x_b$ using $r'$ and $t_b$, in the output spacetime region $R_b$; wherein the plurality of laboratories $L^A$, $L^B$, $L_i^A$ and $L_i^B$ is synchronized to a common reference frame F in a spacetime that is at least approximately Minkowski, wherein $i \in \{0, 1, \ldots, m-1\}$, wherein m corresponds to a cardinality of a plurality of messages $x_i$ from which spacetime-constrained oblivious transfer is to be performed, and wherein output spacetime regions $R_0$, $R_1, \ldots, R_{m-1}$ are specified, wherein no connection by a causal curve in spacetime exists for any pair of output spacetime regions selected from output spacetime regions $R_0, R_1, \ldots, R_{m-1}$, and wherein the transmission of $t_i$ and s by laboratory $L_i^A$ occurs at a spacetime point that is in the causal past of at least one spacetime point of $R_i$ and that is not causally connected to any spacetime point of the output spacetime region $R_k$ for any $k \in \{0, 1, \ldots, m-1\}/\{i\}$, wherein $i \in \{0, 1, \ldots, m-1\}$.

Other aspects of the invention will be apparent from the following description and the appended claims.

BRIEF DESCRIPTION OF DRAWINGS

FIGS. 11.1 and 11.2 show computing systems in accordance with one or more embodiments of the invention.

DETAILED DESCRIPTION

Figure 1:
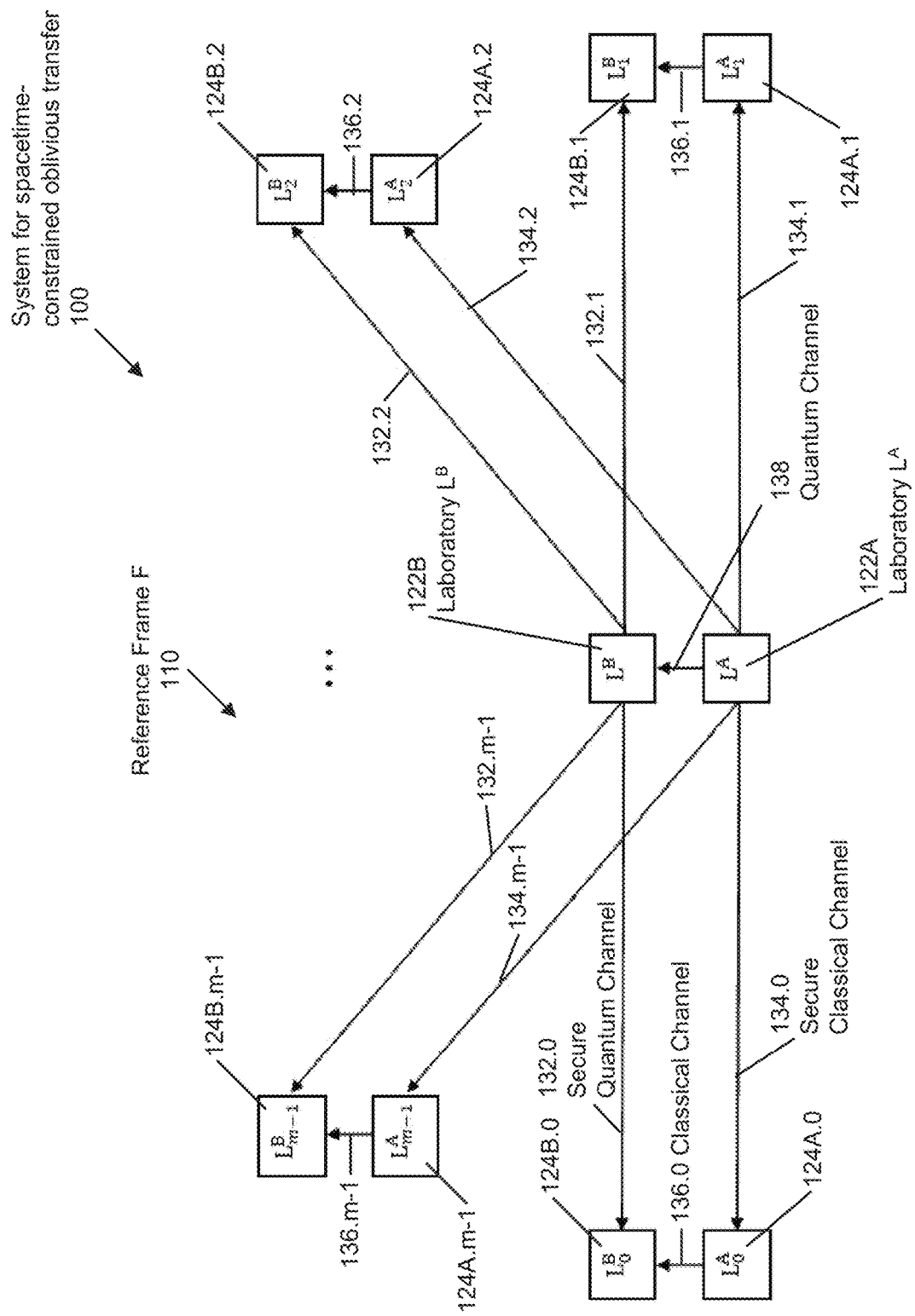
FIG. 1 schematically shows an exemplary system for spacetime-constrained oblivious transfer (SCOT), in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments of the invention provide a method and a system for spacetime-constrained oblivious transfer. Spacetime-constrained oblivious transfer (SCOT) is a variant of the cryptographic task of one-out-of-m oblivious transfer in which relativistic signaling constraints are imposed. From the imposition of relativistic signaling constraints and the use of quantum systems, the method of our invention guarantees unconditional security.

One-out-of-m oblivious transfer is useful in transactions between mistrustful parties A ("Alice") and B ("Bob"), where Alice has a secret database with m entries and Bob requests one of the m entries. More specifically, Alice has m messages $x_0, x_1, \ldots x_{m-1}$ initially secret to Bob, for some integer $m \geq 2$. Bob has a number $b \in \{0, 1, \ldots, m-1\}$ initially secret to Alice. As a result of the one-out-of-m oblivious transfer protocol Bob obtains $x_b$. Bob is guaranteed the secrecy of his choice, and Alice is guaranteed that Bob can only obtain one entry of her database. In other words, two security conditions must be fulfilled by a one-out-of-m oblivious transfer protocol. First, Alice cannot learn Bob's input b, and second, Bob can only obtain one of Alice's messages. One-out-of-m oblivious transfer may, thus, be useful in transactions between mistrustful parties Alice and Bob, where Alice has a secret database with m entries. One-out-of-m oblivious transfer enables the implementation of other complex cryptographic tasks such as secure multi-party computation.

Methods to implement one-out-of-m oblivious transfer generally fall in two broad categories. One category is based on protocols in which Alice and Bob process classical information and communicate classical messages between near laboratories, one controlled by Alice, and the other one controlled by Bob. These protocols are denoted as classical non-relativistic. Another category is based on protocols in which in addition to classical information, Alice and Bob process quantum systems and transmit quantum systems between near laboratories, again, one controlled by Alice, and the other one controlled by Bob. These protocols are denoted as quantum non-relativistic.

The security of classical non-relativistic implementations of one-out-of-m oblivious transfer is based on the assumed difficulty of solving some mathematical problems, for example, the problem of finding the factors of large integer numbers. With the progressive development of more powerful computers, solving mathematical problems that once were thought difficult may become less difficult, thereby potentially making these implementations vulnerable. In particular, the eventual development of a universal quantum computer may make these types of protocols insecure, as a quantum computer may be able to obtain the factors of large numbers in a time that is exponentially smaller than the time taken by the most powerful classical computer. Further, the security of quantum non-relativistic protocols is based on the assumptions that the parties participating in the protocols have limited quantum technologies. For example, it is assumed that the storage of the quantum states of quantum systems is noisy, which means that the quantum states cannot be reliably decoded after storage; or that the storage of the quantum states of quantum systems is bounded, which means that only a limited number of qubits can be stored in a quantum memory.

Accordingly, these methods to implement one-out-of-m oblivious transfer can only guarantee security if some technological assumptions are imposed on dishonest users, and the methods, thus, do not achieve unconditional security. Unconditional security of a method to implement one-out-of-m oblivious transfer is achieved if the method can be guaranteed to be secure even if one of the two parties implementing the method does not follow the method honestly, without assuming any technology limitations.

Lo's no-go theorem states that there cannot be any classical or quantum non-relativistic protocol for one-out-of-m oblivious transfer that achieves unconditional security (H.-K. Lo, Phys. Rev. A, 56, 1154 (1997) ("Lo") is hereby incorporated by reference in its entirety). Lo's no-go theorem states in particular that if a protocol to implement one-out-of-m oblivious transfer is unconditionally secure against Alice, meaning that Alice cannot obtain any information about Bob's input b, then, with sufficiently advanced quantum technology, Bob can obtain the desired message $x_b$ by following the protocol honestly and then by implementing a quantum operation on his quantum systems that allows him to obtain also Alice's message $x_k$, for any $k \in \{0, 1, \ldots, m-1\} \setminus \{b\}$.

Spacetime-constrained oblivious transfer (SCOT) is a cryptographic task where relativistic signaling constraints are imposed on the cryptographic task of one-out-of-m oblivious transfer. SCOT is implemented by two mistrustful parties A ("Alice") and B ("Bob"). Alice and Bob synchronize to a reference frame F in a spacetime that is at least approximately Minkowski, and specify in output spacetime regions $R_0, R_1, \ldots, R_{m-1}$ in the frame F, with the property that every pair of output spacetime regions is spacelike separated, i.e., there is not any pair of output spacetime regions that is connected by any causal curve in spacetime. Alice has m messages $x_0, x_1, \ldots x_{m-1}$ initially secret to Bob, for some integer $m \geq 2$. Bob has a number $b \in \{0, 1, \ldots, m-1\}$ initially secret to Alice. As a result of the SCOT protocol Bob obtains $x_b$ in the output spacetime region $R_b$. Two security conditions must be fulfilled by a SCOT protocol. First, Alice cannot learn Bob's input b anywhere in spacetime and second, Bob cannot obtain $x_i$ in $R_i$ for more than one i from the set $\{0, 1, \ldots, m-1\}$.

By defining SCOT in such a way that Bob must not obtain $x_i$ in $R_i$ for more than one i from the set $\{0, 1, \ldots, m-1\}$, where every pair from the output spacetime regions $R_0, R_1, \ldots, R_{m-1}$ is spacelike separated, SCOT evades Lo's no-go theorem.

Implementing SCOT with unconditional security is in no contradiction with Lo's no-go theorem because if Bob obtains Alice's message $x_b$ in the output spacetime region $R_b$ by following the protocol honestly then, in agreement with Lo's theorem, with sufficiently advanced quantum technology, Bob can implement a quantum operation on his quantum systems that allows him to obtain also Alice's message $x_k$ in some spacetime region $R_k'$, for any $k \in \{0, 1, \ldots, m-1\} \setminus \{b\}$. However, due to the causality of spacetime, and in particular due to the causality of the approximately-Minkowski spacetime near the surface of the Earth, the spacetime region $R_k'$, where the quantum operation that allows Bob to obtain $x_k$ is completed, must necessarily be in the causal future of $R_b$, which is consistent with the definition of SCOT, stating that the output spacetime regions $R_b$ and $R_k$, where the respective messages $x_b$ and $x_k$ must be obtained by Bob, are spacelike separated, i.e., $R_b$ and $R_k$ are not causally connected, hence, $R_k$ is not in the causal future of $R_b$, for any $k \in \{0, 1, \ldots, m-1\} \setminus \{b\}$.

SCOT can have applications where, with high levels of security, a party Bob wants to learn an entry of a database from another party Alice, in some specific region of spacetime (e.g., at a specific location and at a specific time), while keeping his entry choice private from Alice, and by guaranteeing to Alice that only one entry of her database is accessible to Bob in the corresponding spacetime region. For example, potential applications of SCOT are in high frequency trading strategies (HFT) in the stock market, where transactions require high levels of security, and where transactions must be completed within half a millisecond. Other potential applications of SCOT correspond to situations where Alice and Bob own moving objects traveling at high speeds for which they want to keep their locations and trajectories secret from the other party, even though some information on their future trajectories must be disclosed in some situations, for example, if there is danger of collision.

One or more embodiments of the invention include an unconditionally secure method to implement spacetime-constrained oblivious transfer, where unconditional security is guaranteed from the physical laws of quantum theory and relativity.

One or more embodiments of the invention are based on one or more of the fields of quantum mechanics, quantum information theory, quantum cryptography, relativity theory and more specifically on the field of relativistic quantum cryptography. The fundamental concepts of quantum mechanics, quantum information theory and quantum cryptography that are related to embodiments of the invention, may be obtained, for example, from M. A. Nielsen and I. L. Chuang, Quantum Computation and Quantum Information (Cambridge University Press, Cambridge, UK, 2000) ("Nielsen"), which is hereby incorporated by reference in its entirety. Specifically, Nielsen provides information about the properties of qubits, non-orthogonal quantum states, the Bennett-Brassard 1984 (BB84) states, quantum measurements, the no-cloning theorem of quantum physics, the non-perfect distinguishability of non-orthogonal quantum states, and the properties of quantum entanglement. Furthermore, Nielsen familiarizes the reader with the notation used in the fields of quantum information and quantum cryptography. Further, an introduction to relativity theory, which describes the concepts and ideas of relativity, may be obtained from J. Hartle, Gravity: An Introduction to Einstein's General Relativity (Addison-Wesley, San Francisco, Calif., 2003) ("Hartle"), which is hereby incorporated by reference in its entirety. Hartle includes a description of Minkowski spacetime, curved spacetime, spacetime diagrams, the causality of spacetime, curves in spacetime, causal curves, timelike worldlines, null curves, reference frames, inertial reference frames, and the invariance of the speed of light in different inertial reference frames. An introduction to the field of relativistic quantum cryptography, and in particular to the setting and concepts used in the present invention, is provided below. In addition, a more extensive introduction to the field may be obtained from A. Kent, Class. Quantum Grav. 29, 224013 (2012) ("Kent") and D. Pitalúa-García, Phys. Rev. A 93, 062346 (2016) ("Pitalúa-García"), both of which are hereby incorporated by reference in their entirety.

Embodiments of the invention are based on the discipline of relativistic quantum cryptography. Relativistic quantum cryptography investigates cryptographic tasks and protocols whose security is guaranteed from the laws of quantum physics and relativity. Since according to the theory of relativity, spacetime is approximately Minkowski near the surface of the Earth, the speed of light has a finite value near the Earth and physical systems and information cannot travel faster than light. This no-superluminal signaling principle, which is satisfied by quantum physics, is considered a security resource in relativistic quantum cryptography. Additionally, the principles of quantum information, like the no-cloning theorem, the non-perfect distinguishability of non-orthogonal quantum states, the monogamy of quantum entanglement, and the existence of quantum correlations that violate Bell inequalities, may also be relied upon in relativistic quantum cryptography to guarantee security.

FIG. 1 shows an exemplary system for spacetime-constrained oblivious transfer (SCOT), in accordance with one or more embodiments of the invention. In mistrustful cryptography, which includes the task of one-out-of-m oblivious transfer, among others, the parties participating in the cryptographic tasks may not trust each other. The parties performing the task may consist of two or more agents. For the task that corresponds to the present invention there are two parties A and B involved, denoted here by Alice and Bob. It may be assumed in the setting of relativistic quantum cryptography that Alice's agents collaborate with each other and trust each other, and similarly that Bob's agents may collaborate with each other and trust each other, although Alice's agents do not trust Bob's agents, and vice versa, in accordance with one or more embodiments of the invention. Alice's and Bob's agents may participate in the cryptographic protocols to implement the considered cryptographic task by processing and communicating physical systems that encode classical or quantum information at different points in spacetime, as further described below. In the system for spacetime-constrained oblivious transfer (100), shown in FIG. 1, Alice and Bob may agree on a reference frame F (110) with spacetime coordinates (t, x, y, z), where the first entry is temporal and the others are spatial. For convenience, we use units in which the speed of light is unity.

In one or more embodiments of the invention, each agent participating in the cryptographic task controls a secure laboratory (laboratories $L^A$ (122A), $L^B$(122B), $L_0^A$ (124A.0), $L_0^B$ (124.B.0), $L_1^A$ (124A.1), $L_1^B$ (124B.1), $L_2^A$ (124A.2), $L_2^B$ (124B.2), $L_{m-1}^A$ (124A.m-1), and $L_{m-1}^B$ (124B.m-1), in FIG. 1). Communication channels may exist between these laboratories. Some of these communication channels may be secure classical or quantum channels, as discussed in detail below.

A secure laboratory, in accordance with one or more embodiments of the invention, guarantees the agent controlling the laboratory that any information that is generated within the laboratory remains secret from all other agents, unless this information is explicitly communicated outside the laboratory by the transmission of physical systems from the interior to the exterior of the laboratory. Exemplary secure laboratories are discussed in detail below, with reference to FIGS. 4-7.

A secure classical channel between a first and a second agent allows the communication of classical messages between these agents by keeping the communicated messages secret to a third party, in accordance with one or more embodiments of the invention. A secure classical channel may be implemented, for example, via secure physical transportation, or via one-time pad methods using previously distributed secret keys.

A secure quantum channel between a first and a second agent allows the transmission of quantum states between these agents by keeping the identity of the transmitted quantum states secret to a third party, in accordance with one or more embodiments of the invention. A secure quantum channel may be implemented, for example, if the first and second agents each have quantum systems that are in a quantum entangled state, and the quantum state that is to be transmitted is quantum teleported, with the transmission of the classical information required to complete teleportation being done through an authenticated classical channel. Alternatively the secure quantum channel may be based on physical transportation of a quantum system which encodes the quantum state to be transmitted, through a secure laboratory, the secure laboratory being extended from the location of the first to the second agent, or the secure laboratory being displaced from the locations between the first and the second agents.

Continuing with the discussion of the system (100), shown in FIG. 1, the system (100), as previously noted, includes laboratories $L^A$ (122A), $L_0^A$ (124A.0), $L_1^A$ (124A.1), . . . , $L_{m-1}^A$ (124A.m-1), which are respectively controlled by Alice's agents A, $A_0, A_1, \ldots, A_{m-1}$, laboratories $L^B$ (122B), $L_0^B$ (124B.0), $L_0^B$ (124B.1), . . . , $L_{m-1}^B$ (124B.m-1), which are respectively controlled by Bob's agents B, $B_0, B_1, \ldots, B_{m-1}$, a quantum channel (138) between the laboratories $L^A$ and $L^B$; a classical channel between the laboratories $L_i^A$ and $L_i^B$, (136.0-136.m-1) for all i∈{0, 1, . . . , m-1}, a secure classical channel between the laboratories $L^A$ and $L_i^A$ (134.0-134.m-1), for all i∈{0, 1, . . . , m-1}, and a secure quantum channel between the laboratories $L^B$ and $L_i^B$ (132.0-132.m-1), for all i∈{0, 1, . . . , m-1}. In the embodiment shown in FIG. 1, the laboratories are assumed to be stationary in the reference frame F (110) agreed upon a priori by Alice and Bob, in a spacetime that is at least approximately Minkowski. Each laboratory, in one or more embodiments of the invention, occupies a continuous region of three-dimensional space. The respective sets of spatial coordinates in the frame F (110) for the laboratories $L^A$, $L^B$, $L_i^A$ and $L_i^B$ are $\Delta L^A$, $\Delta L^B$, $\Delta L_i^A$ and $\Delta L_i^B$, for i∈{0, 1, . . . , m-1}. The laboratories, in one or more embodiments of the invention, are arranged so that $L_i^B$ is far away from $L_k^B$, for any pair of different numbers i and k from the set {0, 1, . . . , m-1}. In the embodiment shown in FIG. 1, $L^B$ may be near $L^A$, but $L^A$ is far away from $L_i^B$, and $L_i^B$ may be near $L_i^A$, for all i∈{0, 1, . . . , m-1}. Further, the spatial extension of each laboratory is negligible compared to the distance separating any pair of Bob's laboratories, and any pair of Alice's laboratories. The shortest time that light takes to travel from $L^B$ to $L_i^B$ is denoted by $d_i$, for i∈{0, 1, . . . , m-1}. The set of spatial coordinates for the laboratory $L^B$ is assumed to include the origin (0, 0, 0), in the frame F (110). In the frame F, the set of spatial coordinates for the laboratory $L_i^B$ includes the point in space with three-dimensional coordinates given by the three-vector $\vec{v}_i$, for $i \in \{0, 1, \ldots, m-1\}$.

In one or more embodiments of the invention, Alice and Bob agree in advance on integer numbers $m \geq 2$, $N=2^n$ with $n \geq 1$. The value of n is chosen large enough in order to guarantee a desired level of security, as further discussed below. In one or more embodiments of the invention, for $i \in \{0, 1, \ldots, m-1\}$, Alice and Bob agree in advance that the output spacetime region $R_i$ corresponds to the set of spatial coordinates of the laboratory $L_i^B$ of Bob's agent $B_i$ within a short interval of time $\Delta \tau_i = [h_i, h_i + v_i]$, for some small $v_i > 0$, with $h_i > d_i$, that is, $R_i = \{(t, x, y, z) | t \in \Delta \tau_i, (x, y, z) \in \Delta L_i^B\}$. The values of $h_i$ and $v_i$ are chosen by Alice and Bob in order to satisfy that the output spacetime regions $R_0, R_1, \ldots, R_{m-1}$ are pairwise spacelike separated (i.e., there is not any causal curve in spacetime connecting any pair of the output spacetime regions), as further discussed below with reference to FIG. 2.

Alice's agent $A_i$ may generate her input $x_i$ randomly as an n-bit string $x_i = (x_i^0, x_i^1, \ldots, x_i^{n-1})$ with bit entries $x_i^0, x_i^1, \ldots, x_i^{n-1}$ within her laboratory $L_i^A$. Alice's agent $A_i$ generates her input $x_i$ sufficiently before the time $h_i$, more precisely before the time $h_i - \alpha_i - \beta_i$, for small time intervals $\alpha_i > 0$ and $\beta_i > 0$ agreed in advance by Alice and Bob in consideration of the functioning of the devices within their laboratories and their communication channels, as specified below. The values of $\alpha_i$ and $\beta_i$ are chosen small enough so that $h_i - \alpha_i - \beta_i > \tau_i'$, where $\tau_i'$ the greatest time at which a light signal, by following any null curve in spacetime, can leave the laboratory $L_i^A$ and reach another laboratory $L_k^B$ at, or before, the time $h_k + v_k$, for all $k \neq i$ with $k \in \{0, 1, \ldots, m-1\}$.

The input $x_i$ may be generated in various ways. For example, Alice's agent $A_i$ may generate input $x_i$ entirely within her laboratory, or she may compute it from information received by her laboratory before the time $h_i - \alpha_i - \beta_i$, which may include information from Alice's agent A, or from other of Alice's agents, in which case it may be obtained via one or more of the secure classical channels between Alice's laboratories, or from the exterior of any of Alice's laboratories. In one or more embodiments of the invention, the spacetime region where $x_i$ is generated by Alice is contained in $E_i$, which is the intersection of the causal pasts of all the spacetime points of $R_i$. In spacetime-constrained oblivious transfer, the input $x_i$ consists of one out of m messages, $x_0, x_1, \ldots, x_{m-1}$, for $i \in \{0, 1, \ldots, m-1\}$. Additional details are provided below with reference to FIG. 2.

In one or more embodiments of the invention, Bob's agent B generates his input b randomly from the set $\{0, 1, \ldots, m-1\}$ in his laboratory $L^B$ before the time $t=0$, in the frame F. Bob's agent B may generate b in various ways, For example, he may generate b entirely in his laboratory, or he may compute b from information that he receives in his laboratory before the time $t=0$. We note that since $h_i > d_i$, where $d_i$ is the shortest time that light takes to travel from $L^B$ to $L_i^B$, for $i \in \{0, 1, \ldots, m-1\}$, Bob's input b is generated within the spacetime region G, which is the intersection of the causal pasts of all the spacetime points of all the output spacetime regions $R_0, R_1, \ldots, R_{m-1}$, as specified above. In a SCOT task, the input b is a selector input that specifies one of the m messages to be received by Bob in the corresponding output spacetime region. Additional details are provided below with reference to FIG. 2.

Figure 2:
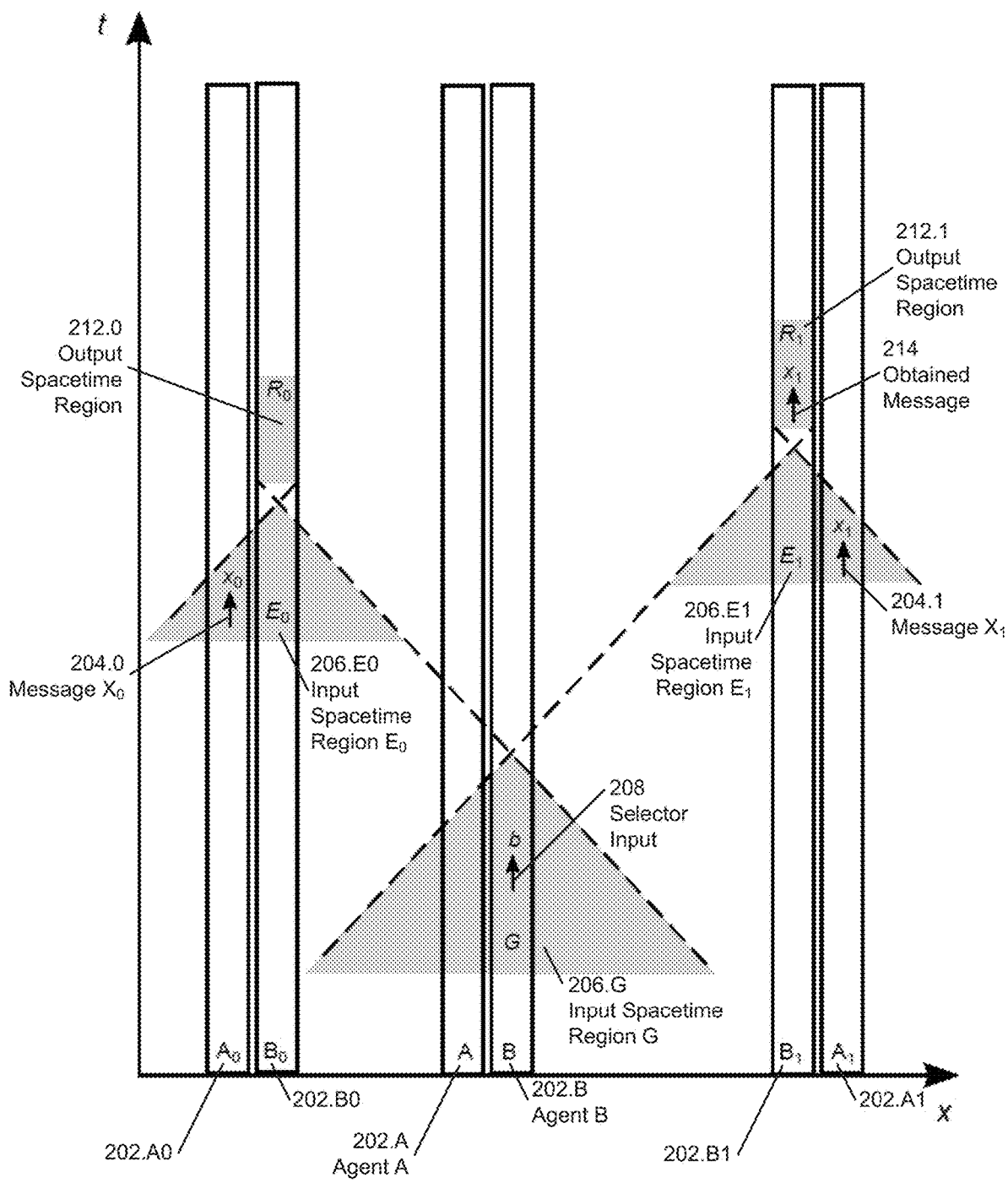
FIG. 2 shows an exemplary two-dimensional spacetime diagram in the temporal dimension t and in the spatial dimension x, enabling implementation of SCOT, in accordance with one or more embodiments of the invention.

FIG. 2 shows an exemplary two-dimensional spacetime diagram in the temporal dimension t and in the spatial dimension x, in a spacetime that is at least approximately Minkowski, enabling implementation of SCOT, in accordance with one or more embodiments of the invention.

FIG. 2 illustrates the spacetime regions $E_0$ (206.E0), $E_1$ (206.E1), G (206.G), $R_0$ (212.0) and $R_1$ (212.1), as they are relied upon by the SCOT method implemented on the system shown in FIG. 1. FIG. 2 illustrates the simple case in which m=2 and Alice's and Bob's laboratories are collinear in the x direction. Those skilled in the art will appreciated that other configurations, e.g., with m>2 are feasible, without departing from the invention. FIG. 2 shows the world lines of the respective laboratories of the agents A, B, $A_0$, $B_0$, $A_1$, and $B_1$ (202.A, 202.B, 202.A0, 202.B0, 202.A1 and 202.B1). The output spacetime regions $R_0$ and $R_1$ (212.0 and 212.1) are shown as gray small rectangles, which are spacelike separated, i.e., there is not any causal curve in spacetime connecting $R_0$ and $R_1$. Sections of the respective regions of spacetime $E_0$, $E_1$ and G (206.E0, 206.E1 and 206.G), where Alice's agents generate the inputs or messages $x_0$ (204.0) and $x_1$ (204.1), and where Bob's agent generates the input or selector input b (208), are illustrated by the gray triangles, which are delimited by dotted lines, representing light rays. The output of the message $x_b$ in the output spacetime region $R_b$ is also illustrated for the case b=1, thus showing $x_1$ (214).

The system of FIG. 1, using the spacetime constraints illustrated in FIG. 2, in accordance with one or more embodiments of the invention allows Alice and Bob to implement SCOT with unconditional security. The security of the method implemented on the system of FIG. 1 is based on two physical principles: 1) the causality of Minkowski (or near-Minkowski) spacetime, implying in particular that the transmission of information cannot be faster than light, and 2) the monogamy of quantum entanglement.

In particular, as illustrated in the spacetime diagram of FIG. 2, the output spacetime regions are spacelike separated, in accordance with one or more embodiments of the invention. In other words, these regions are not connected by any causal curve in spacetime. Thus, no information obtained by Bob's agent $B_i$ in the output spacetime region $R_i$ can be communicated to Bob's agent $B_k$ in the output spacetime region $R_k$, for any pair of different numbers i, k $\{0, 1, \ldots, m-1\}$. This important physical property satisfied by the system of FIG. 1 may allow Alice and Bob to evade Lo's no-go theorem, which states that unconditionally secure one-out-of-m oblivious transfer is impossible in the standard setting of non-relativistic quantum cryptography.

The spacetime region $R_i$ can be, for example, the set of spacetime points $R_i = \{(t,x,y,z) | h_i \leq t \leq h_i + v_i, (x,y,z) \in \Delta L_i^B\}$, where $h_i > 0$, $v_i > 0$ and $\Delta L_i^B$ is a set of points in three-dimensional space that defines the space coordinates of one of Bob's laboratories, for $i \in \{0, 1, \ldots, m-1\}$; that is, $R_i$ corresponds to the set of all spacetime events that occur within Bob's laboratory having three-dimensional space coordinates $\Delta L_i^B$ within the period of time $[h_i, h_i + v_i]$, for $i \in \{0, 1, \ldots, m-1\}$. In the simple example that $h_i = h$ and $v_i = v$ for all $i \in \{0, 1, \ldots, m-1\}$, in order to satisfy the spacelike separation of every pair of output spacetime regions $R_i$ and $R_k$, it is required that the shortest time that light takes to travel between any spatial point in $\Delta L_i^B$ and any spatial point in $\Delta L_k^B$ is greater than v, for all i, k$\in \{0, 1, \ldots, m-1\}$ with i$\neq$k; for example, by setting the pair of Bob's laboratories whose sets of spatial coordinates are $\Delta L_i^B$ and $\Delta L_k^B$ with a straight line distance separation of at least 150 km, for all i, k$\in \{0, 1, \ldots, m-1\}$ with i$\neq$k, and considering that the speed of light through vacuum is approximately 300 000 km/s, by setting the value of the time interval v to be not greater than 0.5 ms, spacelike separation of every pair of output spacetime regions can be guaranteed. Small corrections in the values of the time coordinates $h_i$, the time intervals $v_i$, and the sets of spatial coordinates $\Delta L_i^B$, for $i \in \{0, 1, \ldots, m-1\}$, must be considered in the case of small spacetime curvatures, for example near the surface of the Earth, in order to guarantee that light signals leaving the output spacetime region $R_i$ cannot arrive to the output spacetime region $R_k$ and vice versa, for all $i$, $k \in \{0, 1, \ldots, m-1\}$ with $i \neq k$. Those skilled in the art will appreciate that these conditions hold for various environments, e.g., near the surface of the Earth, but also in regions that are somewhat more remote from the Earth's surface such as satellite orbits.

The SCOT method in accordance with one or more embodiments of the invention may be extended to arbitrary curved spacetime, where the curvature of spacetime must be considered when setting the values of the output spacetime regions $R_0, R_1, \ldots, R_{m-1}$ in order to guarantee that light signals leaving one of the output spacetime regions cannot reach any other output spacetime region.

Figure 3:
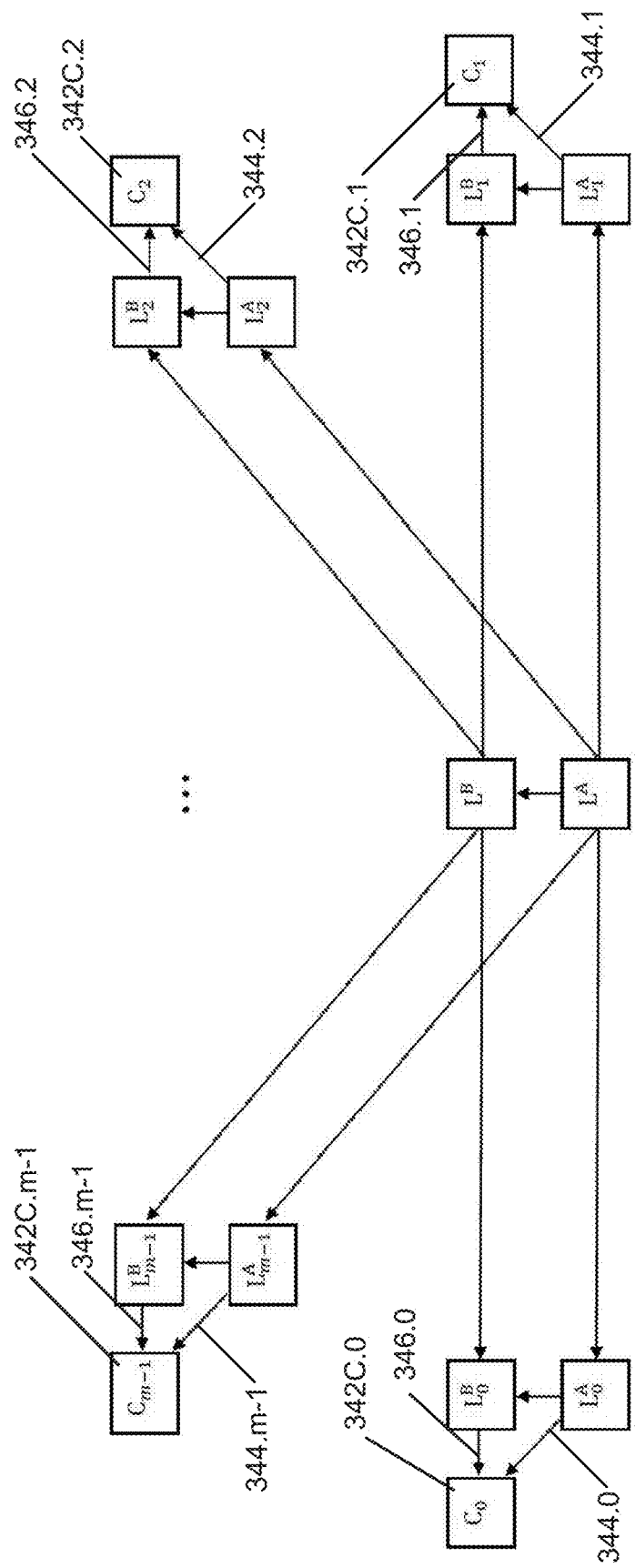
FIG. 3 schematically shows an exemplary system for SCOT including verification devices, in accordance with one or more embodiments of the invention.

Turning to FIG. 3, an exemplary system for SCOT including verification devices, in accordance with one or more embodiments of the invention, is shown. The system shown in FIG. 3 may be used to verify whether Bob obtains Alice's message $x_i$ in the output spacetime region $R_i$, for $i \in \{0, 1, \ldots, m-1\}$, according to the system of FIG. 1. The system comprises, for $i \in \{0, 1, \ldots, m-1\}$, a verification device $C_i$ (342C.0-342C.m-1) that is near Alice's and Bob's respective laboratories $L_i^A$ and $L_i^B$, connected by one-way secure channels from $L_i^A$ to $C_i$ (344.0-344.m-1), and from $L_i^B$ to $C_i$ (346.0-346.m-1). In this embodiment, the verification device $C_i$ is stationary in the frame F, for $i \in \{0, 1, \ldots, m-1\}$. For convenience, in this embodiment, the one-way secure classical channel from the laboratory $L_i^B$ ($L_i^A$) to $C_i$ is considered part of $L_i^B$ ($L_i^A$), implying that the set of the three-dimensional spatial coordinates of the channel from $L_i^B$ ($L_i^A$) to $C_i$ is included in $\Delta L_i^B$ ($\Delta L_i^A$), hence, $C_i$ is adjacent to $L_i^B$ and to $L_i^A$, for $i \in \{0, 1, \ldots, m-1\}$. For simplicity, in FIG. 3, only the components introduced in addition to those already introduced in FIG. 1 are labeled. All other components may be assumed to be identical to those shown in FIG. 1. A detailed description of verification operations is provided below with reference to FIG. 10.

The subsequently described FIGS. 4-8 schematically show the laboratories $L^A$, $L^B$, $L_i^A$, and $L_i^B$, respectively, for any $i \in \{0, 1, \ldots, m-1\}$. Each of these laboratories may contain an atomic clock and a computer, in addition to other components specified below. Each of these laboratories may also contain GPS devices (not shown) and external connections (not shown) that are used to receive GPS signals. The atomic clock of each laboratory may be synchronized in advance to Alice's and Bob's common reference frame F, and may be kept synchronized to the frame F during the whole implementation of SCOT. The GPS devices may be used by these laboratories to synchronize the time of the atomic clock to Alice's and Bob's common reference frame F and to measure its location in this frame. The atomic clock may measure the time with high precision, allowing the computer of the corresponding laboratory to perform specific actions that are timed with high levels of precision. For example, atomic clocks can maintain the time measurement accuracy within a few nanoseconds after functioning for a day.

Figure 4:
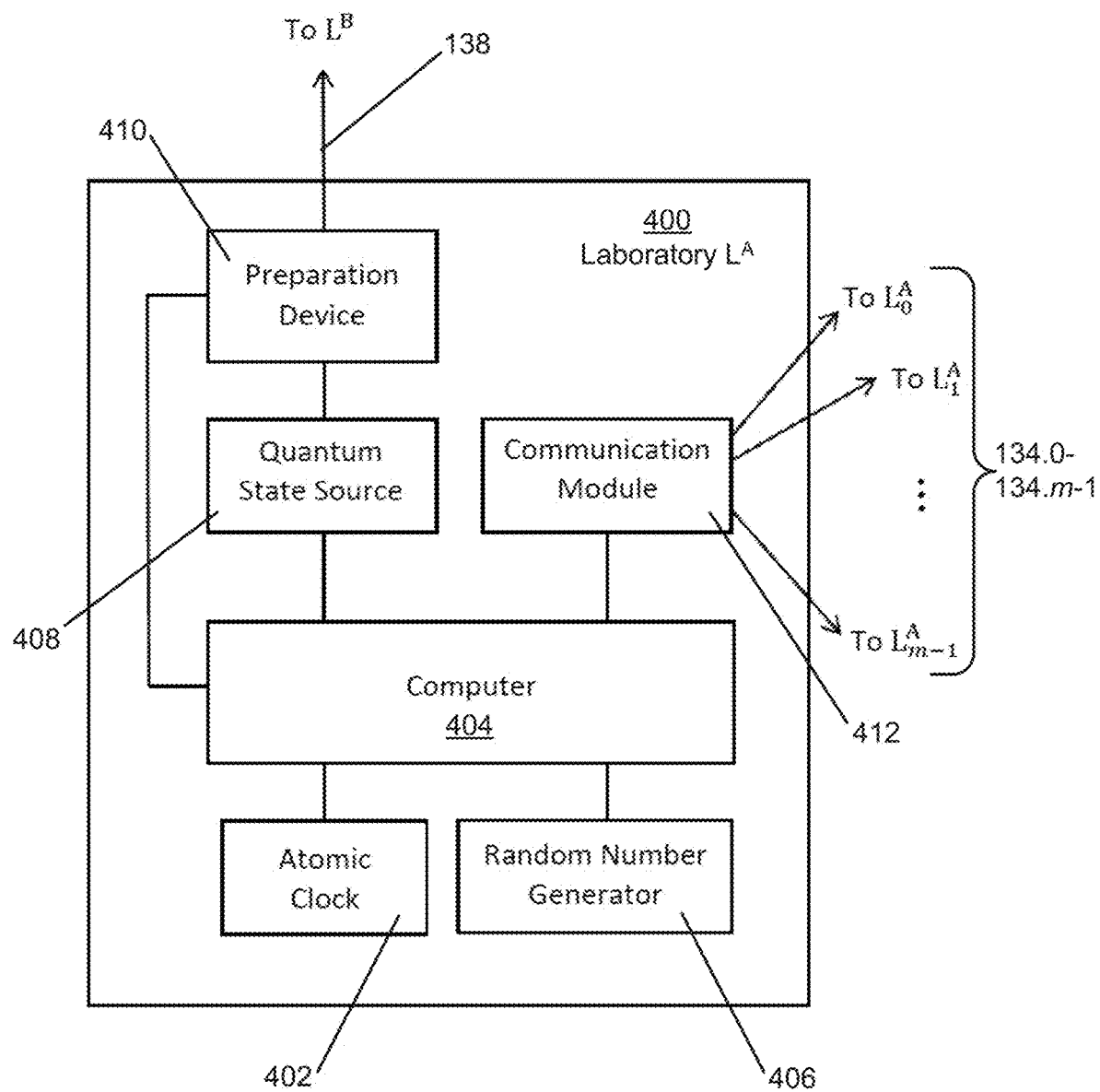
FIG. 4 schematically shows a laboratory $L^A$, in accordance with one or more embodiments of the invention.

Turning to FIG. 4, a laboratory $L^A$, in accordance with one or more embodiments of the invention, is shown. The laboratory $L^A$ (400) may be controlled by Alice's agent A. $L^A$ (400) may include an atomic clock (402), a computer (404), a random number generator (406), a quantum state source (408), a preparation device (410) which is connected to the quantum channel (138) to the laboratory $L^B$ (as illustrated in FIG. 1) and a communication module (412), which is connected to the m secure classical channels (134.0-134.m-1) to the laboratories $L_0^A, L_1^A, \ldots, L_{m-1}^A$ (as illustrated in FIG. 1). The random number generator (406) may generate the random numbers r, $s \in \{0, 1\}^n$, which may be provided to the computer (404), where they may be recorded. For $i \in \{0, 1, \ldots, m-1\}$, the computer (404) may instruct the communication module (412) to communicate the numbers r and s to the laboratory $L_i^A$ via the secure classical channels (134.0-134.m-1) between $L^A$ and $L_i^A$. The computer (404) may be any type of computing system, e.g., a computing system similar to the computing system discussed with reference to FIGS. 11.1 and 11.2. Using the input of the computer (404) and the value of the time provided by the atomic clock (402), the quantum state source (408) produces a quantum system of n qubits within a specific and small interval of time, which after passing through the preparation device (410) may be prepared in the quantum state $|\psi_r^s\rangle$. Then, the quantum state is sent through the quantum channel (138) to the laboratory $L^B$, controlled by Bob's agent B.

In one or more embodiments of the invention, the quantum state that is prepared at $L^A$ is $$|\psi_r^s\rangle_a = \bigotimes_{j=0}^{n-1} |\psi_{r^j}^{s^j}\rangle_{a^j}, \qquad (1)$$

where $a = a^0, a^1, \ldots, a^{n-1}$ represents the quantum system of n qubits and $a^j$ represents the jth qubit, for $j \in \{0, 1, \ldots, n-1\}$. For $j \in \{0, 1, \ldots, n-1\}$, the state of the jth qubit may be the BB84 state $|\psi_{r^j}^{s^j}\rangle$, where the value of the bit $s^j$ indicates whether the state is prepared in the computational basis $\{|0\rangle, |1\rangle\}$, if $s^j = 0$, or in the Hadamard basis $\{|+\rangle, |-\rangle\}$, if $s^j = 1$, and where $r_j$ indicates the encoded outcome, i.e., where $|\psi_{r^j}^0\rangle = |r^j\rangle$, for $r^j \in \{0, 1\}$, $|\psi_0^1\rangle = |+\rangle$ and $|\psi_1^1\rangle = |-\rangle$.

The quantum state of the n-qubits system may be prepared at a specific time and within a short interval of time, as controlled by the computer (404) with the value of the time provided by the atomic clock (402), in such a way that, after passing through the quantum channel (138), the quantum state arrives at the laboratory $L^B$ within the time interval $\Delta \tau_P = [0, \delta]$, for some small $\delta > 0$. The value of $\delta$ may have previously been agreed upon by Alice and Bob, taking into account the functioning of all the relevant devices for the preparation and transmission of the quantum state from $L^A$ to $L^B$ and the precision of the atomic clocks in $L^A$ and $L^B$. Thus, since the spacetime coordinates of the laboratory $L^B$ includes the origin, in the frame F, the quantum state is received by Bob's agent B near the spacetime point $P = (0, 0, 0, 0)$, more precisely within the spacetime region $\Delta P = \{(t, x, y, z) | t \in \Delta \tau_P, (x, y, z) \in \Delta L^B\}$.

In one or more embodiments of the invention, the time at which the messages r and s are sent by $L^A$ is controlled by the computer (404) using the time value provided by the atomic clock (402) so that the messages arrive at $L_i^A$ before the time $h_i - \alpha_i - \beta_i$, which is previously agreed upon by Alice and Bob, with $h_i > d_i + \delta$, $\alpha_i > 0$, and $\beta_i > 0$, for $i \in \{0, 1, \ldots, m-1\}$. The values of the parameters $\alpha_i$, $\beta_i$, and $\epsilon_i$, with $0 < \epsilon_i < v_i$, may be chosen by Alice and Bob in such a way that, after passing through $L^B$, the quantum state prepared at $L^A$ can arrive at $L_i^B$, via the quantum channel between $L^B$ and $L_i^B$, not earlier than the time $h_i$ and not later than the time $h_i + v_i - \epsilon_i$, and in such a way that by reception of the messages r and s by $L_i^A$ not later than the time $h_i - \alpha_i - \beta_i$, the processing and communication of the messages s and $t_i=r\oplus x_i$ to the laboratory $L_i^B$ can be completed not later than the time $h_i-\beta_i$, for $i\in\{0, 1, \ldots, m-1\}$. The transmission of the message s by $L_i^A$ to $L_i^B$ must begin after the time $\tau_i'$, which is the greatest time at which a light signal can leave the laboratory $L_i^A$ and reach any other laboratory $L_k^B$ at, or before, the time $h_k+v_k$, for all $k\neq i$ with i, $k\in\{0, 1, \ldots, m-1\}$. This condition guarantees, based on the causality of spacetime, that no information about s can be received by Bob's agent $B_k$ in the output spacetime region $R_k$, for all $k\neq i$ with i, $k\in\{0, 1, \ldots, m-1\}$, hence, the security proof described further below applies. The parameters $\alpha_i$ and $\beta_i$ must be chosen small enough, compared to the smallest times that light takes to travel between the laboratories $L_i^A$ and $L_k^B$ for all $k\neq i$, in order to satisfy that $h_i-\alpha_i-\beta_i>\tau_i'$, for $i\in\{0, 1, \ldots, m-1\}$.

Figure 5:
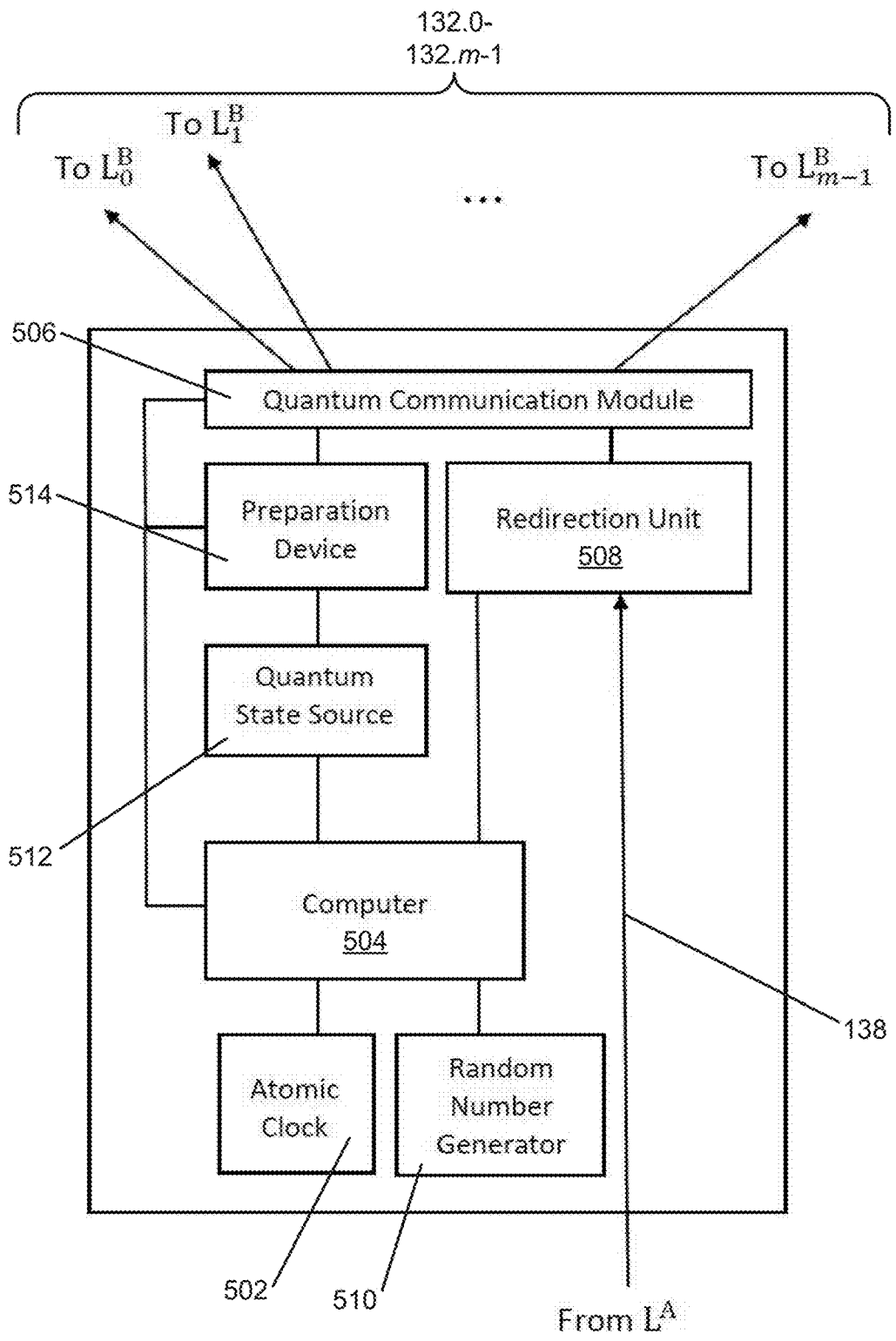
FIG. 5 schematically shows a laboratory $L^B$, in accordance with one or more embodiments of the invention.

Turning to FIG. 5, a laboratory $L^B$, in accordance with one or more embodiments of the invention, is shown. The laboratory $L^B$ (500) may be controlled by Bob's agent B. $L^B$ (500) may include an atomic clock (502), a computer (504), a quantum communication module (506) connected to m secure quantum channels (132.0-132.m−1), which are respectively connected to the laboratories $L_0^B$, $L_1^B$, ..., $L_{m-1}^B$, a redirection unit (508) connected to one of the m secure quantum channels, via the quantum communication module, a random number generator (510), a quantum state source (512), and a preparation device (514) connected to m−1 of the m secure quantum channels, via the quantum communication module (506). The computer (504) may be any type of computing system, e.g., a computing system similar to the computing system discussed with reference to FIGS. 11.1 and 11.2. Controlled by the computer (504), the redirection unit (508) is set into a state $i\in\{0, 1, \ldots, m-1\}$, which, via the quantum communication module (506), redirects the quantum state received from the laboratory $L^A$ to the laboratory $L_i^B$, through the secure quantum channel (132.0-132.m−1) between $L^B$ and $L_i^B$. As mentioned above, the quantum state transmitted from $L^A$ may arrive at $L^B$ via the quantum channel (138) within the time interval $\Delta\tau_P=[0, \delta]$. Using the time value provided by the atomic clock (502), and the value of Bob's input b stored in the computer (504), the computer may set the redirection unit (508) to the state b, at a time before t=0, and may keep the redirection unit in this state until redirection of the quantum state is completed. Thus, the quantum state received from $L^A$ may be redirected to the laboratory $L_b^B$. In one or more embodiments of the invention, in order to avoid a security attack by Alice in which, by inspecting that only one of the m channels is transmitting quantum states, she could guess correctly the value of Bob's input b, the following actions are implemented by the laboratory $L^B$. The quantum state source generates m−1 quantum systems of n qubits, where each qubit is prepared in a random BB84 state by the preparation device (514), according to specifications of the computer (504), with the aid of random numbers stored in the computer that are previously generated by the random number generator (510). Via the quantum communication module (506), these m−1 random states are sent through the secure quantum channels (132.0-132.m−1) from $L^B$ to the laboratories $L_i^B$, at the same time that the quantum state received from Alice's laboratory $L^A$ is being redirected to $L_b^B$, for $i\in\{0, 1, \ldots, m-1\}\setminus\{b\}$. These actions may be varied according to how the secure quantum channels are implemented in practice. For example, if the secure quantum channels are implemented via quantum teleportation, with the transmission of classical messages completing the teleportation of the transmitted quantum states, then the transmission of the quantum states comprising n random BB84 states may be replaced by simply sending random classical messages from the set of messages that complete the quantum teleportation.

Figure 6:
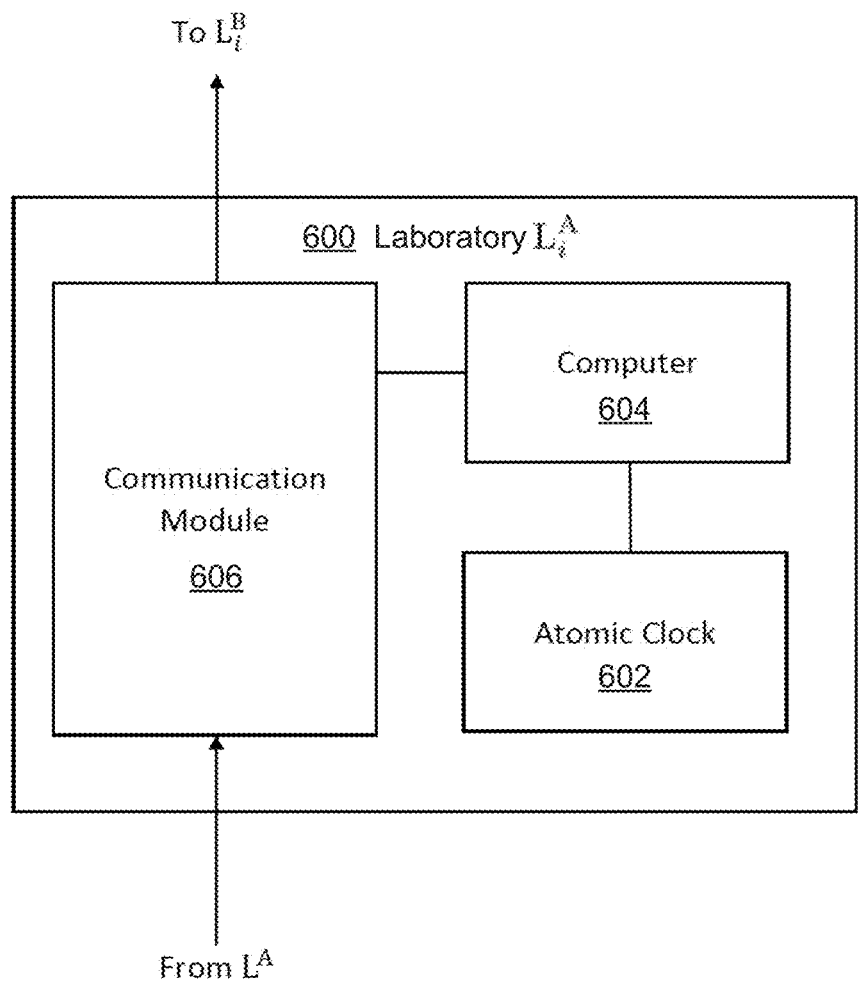
FIG. 6 schematically shows a laboratory $L_i^A$, for $i \in \{0, 1, \ldots, m-1\}$, in accordance with one or more embodiments of the invention.

Turning to FIG. 6 a laboratory $L_i^A$, for $i\in\{0, 1, \ldots, m-1\}$, in accordance with one or more embodiments of the invention, is shown. The laboratory $L_i^A$ (600) may be controlled by Alice's agent $A_i$, for $i\in\{0, 1, \ldots, m-1\}$. It may include an atomic clock (602), a computer (604), and a communication module, which is connected to the secure classical channel from the laboratory $L^A$ and to the classical channel towards the laboratory $L_i^B$. The computer (604) may be any type of computing system, e.g., a computing system similar to the computing system discussed with reference to FIGS. 11.1 and 11.2. Alice's input message $x_i$ may are stored in the computer (604) before the time $h_i-\alpha_i-\beta_i$. As mentioned above, the messages r and s coming from $L^A$ arrive to $L_i^A$ before the time $h_1-\alpha_i-\beta_i$. The messages r and s may arrive to the communication module (606) from the laboratory $L^A$. The communication module (606) may send r and s to the computer (604), where they may be stored and processed with the value of Alice's input $x_i$ in order to obtain $t_i=r\oplus x_i$ as further discussed below. Controlled by the value of the time provided by the atomic clock (602), the computer (604) instructs the communication module (606) to send the messages s and $t_i$ to the laboratory $L_i^B$, via the classical channel connecting these laboratories, at a time so that the reception of these messages at $L_i^B$ is completed before the time $h_i-\beta_i$.

Figure 7:
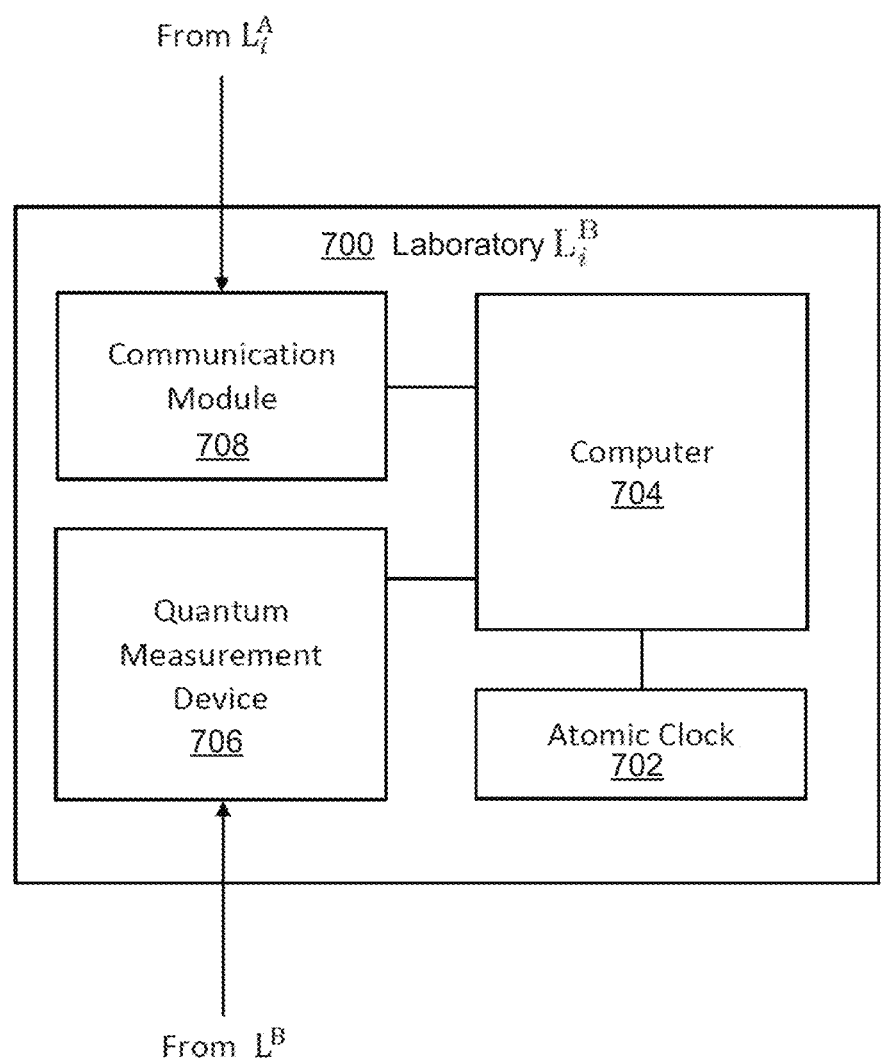
FIG. 7 schematically shows a laboratory $L_i^B$, for $i \in \{0, 1, \ldots, m-1\}$, in accordance with one or more embodiments of the invention.

Turning to FIG. 7, a laboratory $L_i^B$, for $i\in\{0, 1, \ldots, m-1\}$, in accordance with one or more embodiments of the invention, is shown. The laboratory $L_i^B$ may be controlled by Bob's agent $B_i$, for $i\in\{0, 1, \ldots, m-1\}$. $L_i^B$ may include an atomic clock (702), a computer (704), a quantum measurement device (706), which is connected to the secure quantum channel from the laboratory $L^B$, and a communication module (708), which is connected to the classical channel from the laboratory $L_i^A$. The computer (704) may be any type of computing system, e.g., a computing system similar to the computing system discussed with reference to FIGS. 11.1 and 11.2. As mentioned above, the messages s and $t_i$ coming from $L_i^A$ arrive at $L_i^B$ before the time $h_i-\beta_i$. The quantum state coming from $L^B$ arrives at $L_i^B$, not earlier than the time $h_i$ and not later than the time $h_i+v_i-\epsilon_i$, as mentioned above. The communication module (708) may receive the messages s and $t_i$ from the laboratory $L_i^A$ and may send them to the computer (704), where these messages may be stored. Using s and the time given by the atomic clock (702), the computer (704) may instruct the quantum measurement device (706) to measure the incoming quantum state in the basis labeled by s, on which it was initially prepared by Alice's agent A. The value of $\beta_i$ is previously chosen in such a way that by reception of s not later than the time $h_i-\beta_i$ at $L_i^B$, the quantum measurement device can be set to measure the incoming quantum state in the basis labeled by s before the time $h_i$. The outcome $r_i$ of the quantum measurement is communicated from the quantum measurement device to the computer (704). The computer (704) uses $r_i$ and $t_i$ to compute $t_i\oplus r_i$. The value of $\epsilon_i$ is previously chosen in such a way that by reception and measurement of the incoming quantum state at a time not later than $h_i+v_i-\epsilon_i$, the outcome $r_i$ of the measurement is obtained and processed by the computer (704) with the number $t_i$ in order to obtain and output $r_i\oplus t_i$ before the time $h_i+v_i$. The computer (704) outputs $r_i\oplus t_i$ within the interval of time $\Delta\tau_i=[h_i, h_i+v_i]$. In the case that i=b, the incoming quantum state is the quantum state generated by Alice's agent A in the basis labeled by s, after redirection by Bob's agent B, hence, in the case b=i, the outcome of the measurement performed by the quantum measurement device on the incoming quantum state is the number r. Thus, in the case i=b, Bob outputs $r \oplus t_b$, which equals $x_b$, within the output spacetime region $R_b = \{(t, x, y, z) | t \pm \Delta \tau_b, (x, y, z) \in \Delta L_b^B\}$, as required.

Figure 8:
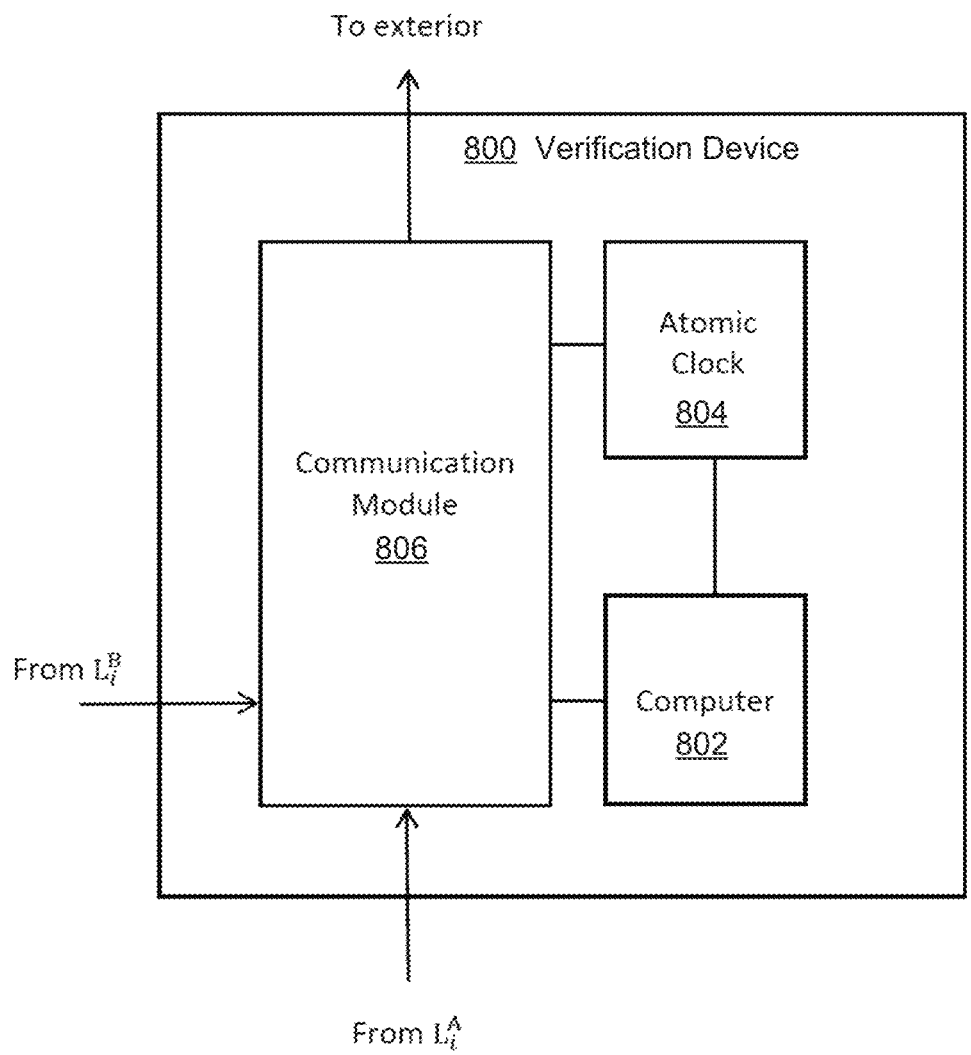
FIG. 8 schematically shows a verification device $C_i$, for $i \in \{0, 1, \ldots, m-1\}$, in accordance with one or more embodiments of the invention.

Turning to FIG. 8, a verification device $C_i$, for $i \in \{0, 1, \ldots, m-1\}$, in accordance with one or more embodiments of the invention, is shown. The verification device (800) may include a computer (802), an atomic clock (804), and a communication module (806). The computer (802) may be any type of computing system, e.g., a computing system similar to the computing system discussed with reference to FIGS. 11.1 and 11.2. The verification device (800) may further contain global positioning system (GPS) devices (not shown) and external connections (not shown) that may be used to receive GPS signals and to communicate with external devices (not shown). The atomic clock (804) may be synchronized in advance to Alice's and Bob's common reference frame F, and may be kept synchronized to the frame F during the execution of the entire verification procedure. The GPS devices may be used by the verification device (800) to synchronize the time of the atomic clock (804) to Alice's and Bob's common reference frame F and to measure its location in this frame. In one or more embodiments of the invention, the verification device (800) receives Alice's message $x_i$ from the laboratory $L_i^A$, and Bob's output $y_i$ from the laboratory $L_i^B$, via the one-way secure channels from these laboratories. The atomic clock (804) may measure the time at which signals are received from Alice's laboratory $L_i^A$ and from Bob's laboratory $L_i^B$. The computer (802) may have an internal state initially set to "neutral". It may remain in this state until it receives a signal from Alice's laboratory $L_i^A$ and a signal from Bob's laboratory $L_i^B$.

Figure 10:
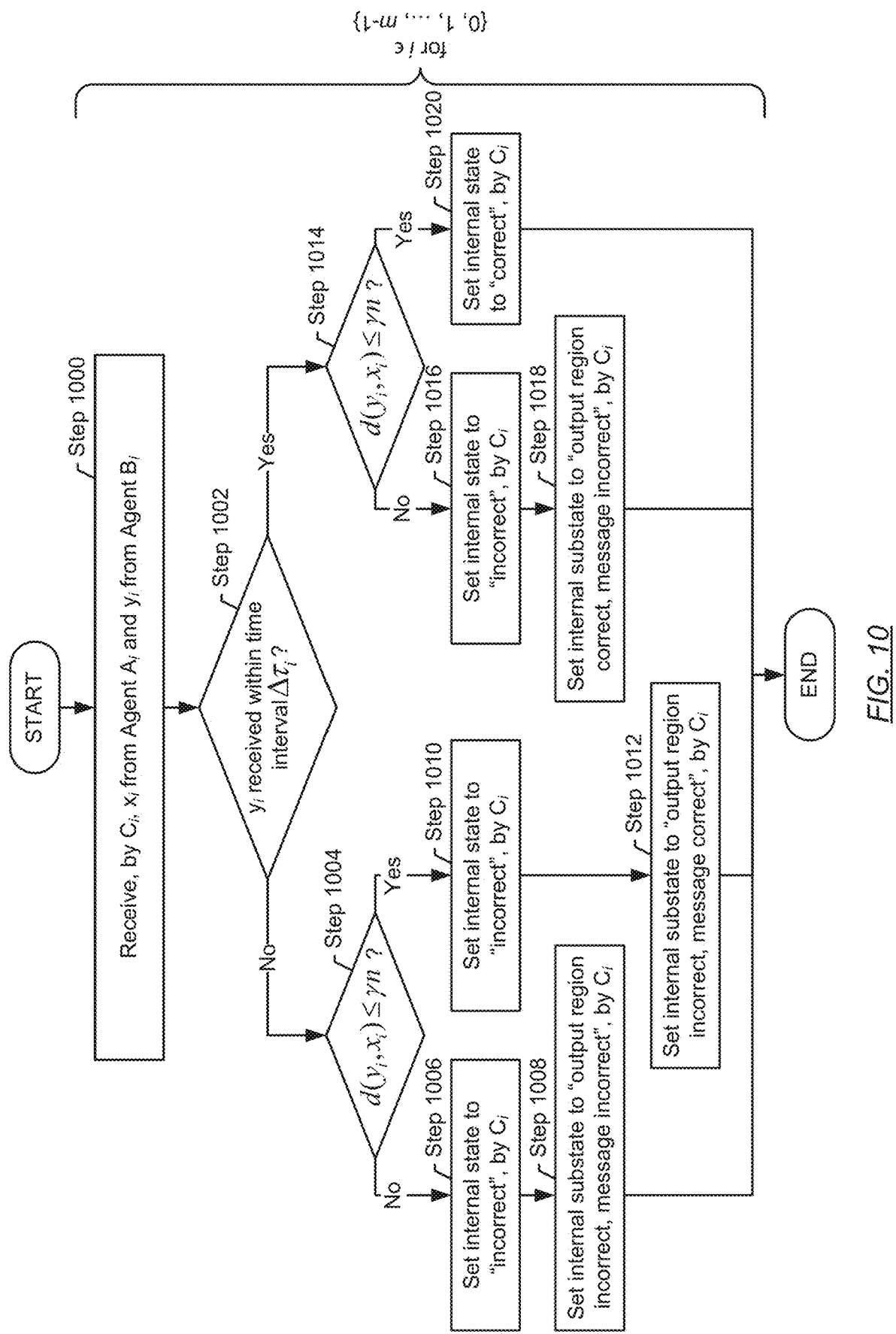
FIG. 10 shows a flowchart including steps implementing a verification of SCOT, in accordance with one or more embodiments of the invention.

The computer (802) may use the signals received from $L_i^A$ and $L_i^B$, and the time of arrival of the signal received from Bob's laboratory $L_i^B$ as measured by the atomic clock (804) and may compute whether the following two conditions are satisfied: 1) Bob's message $y_i$ is sufficiently close to $x_i$, according to a threshold $d(y_i, x_i) \leq \gamma n$ previously agreed by Alice and Bob and known by the computer, where d(a', a) denotes the Hamming distance between two n-bits strings a' and a, which is the number of bit entries in which a' and a differ; and 2) Bob's signal is received within the time interval $\Delta \tau_i$. Depending on whether conditions 1) and 2) are satisfied, the computer may changes the internal state of the verification device to "correct" or "incorrect", as further discussed below with reference to the method shown in FIG. 10. The "incorrect" state may be divided further in substrates, as shown in FIG. 10. According to the value of the internal state, and of the internal substrates, of the verification device (800), the computer (802) may perform one of different programmed actions and may instruct the communication module (806) to send one of different possible signals to external devices via its external connections.

Figure 9A:
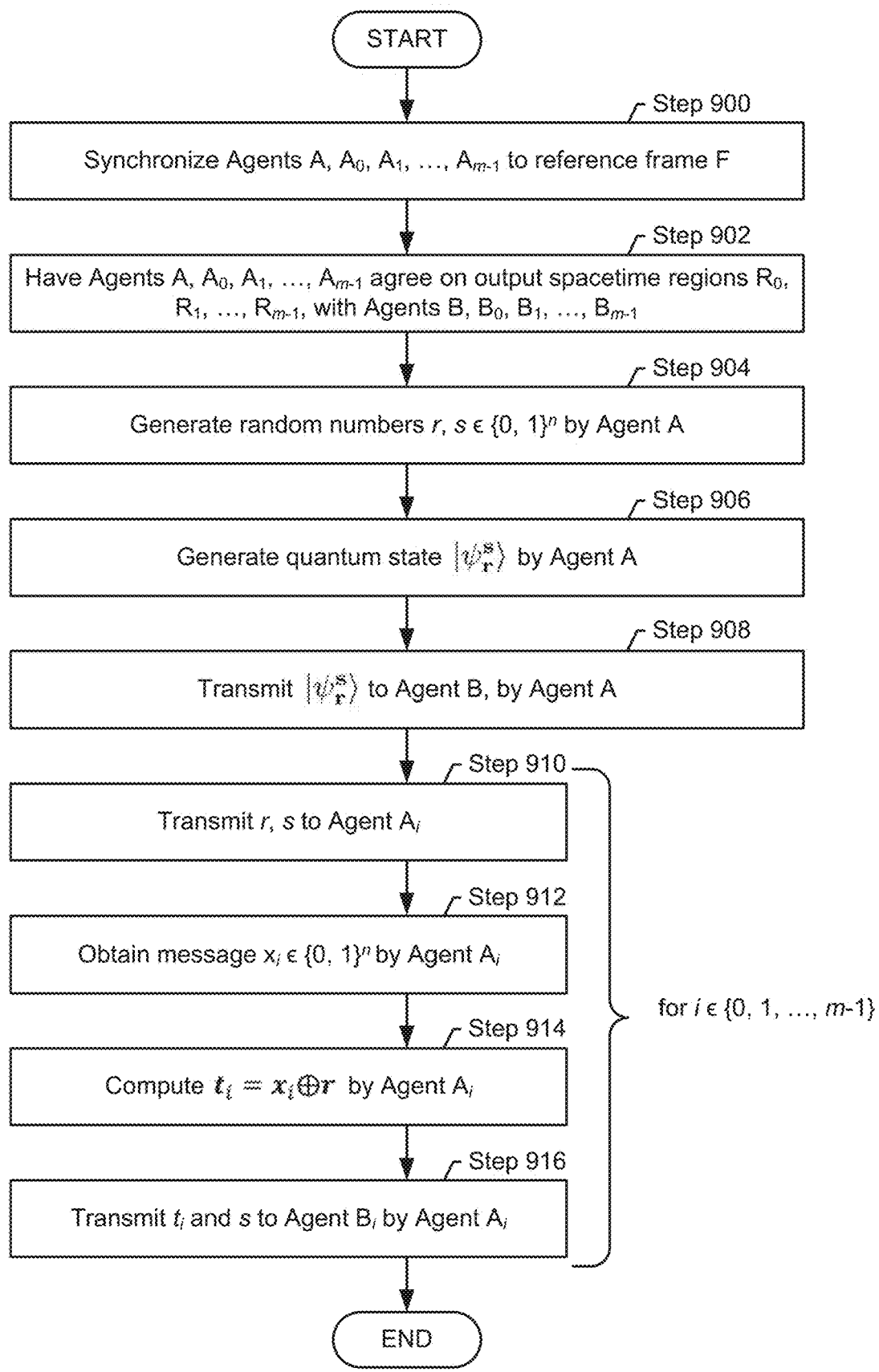
FIG. 9A shows a flowchart including steps performed by a party A implementing SCOT, in accordance with one or more embodiments of the invention.
Figure 9B:
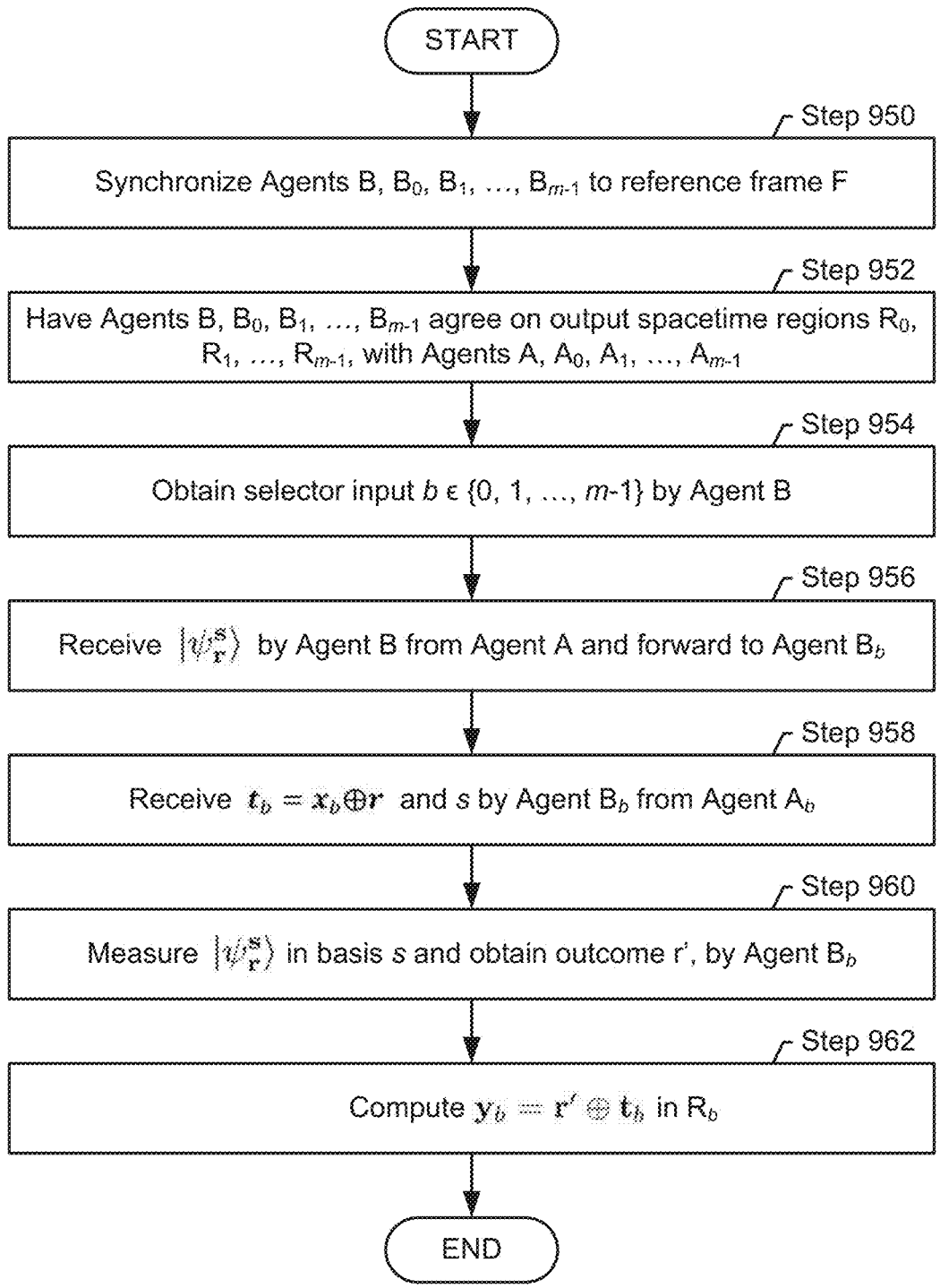
FIG. 9B shows a flowchart including steps performed by a party B implementing SCOT, in accordance with one or more embodiments of the invention.

FIGS. 9A, 9B, and 10 show flowcharts in accordance with one or more embodiments of the invention. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Turning to FIGS. 9A and 9B, a method for performing spacetime-constrained oblivious transfer (SCOT) according to an embodiment of the present invention using the system of FIG. 1 is shown, wherein FIG. 9A shows the steps performed by party A, and wherein FIG. 9B shows the steps performed by party B.

In Step 900, party A's (Alice) agents $A, A_0, A_1, \ldots, A_{m-1}$ synchronize to a reference frame F in a spacetime that is at least approximately Minkowski. An equivalent step is performed by party B's (Bob) agents $B, B_0, B_1, \ldots, B_{m-1}$, as described below in Step 950 of FIG. 9B.

In Step 902, party A's and party B's agents agree on m output spacetime regions $R_0, R_i, \ldots, R_{m-1}$ having the property of being spacelike separated, i.e., with no causal curve in spacetime connecting $R_i$ with $R_k$, for any pair of different numbers i, k, from the set $\{0, 1, \ldots, m-1\}$. Step 902 is performed in conjunction with Step 952 of FIG. 9B. In this embodiment, we consider that $R_i = \{(t, x, y, z) | h_i \leq t \leq h_i + v_i, (x, y, z) \in \Delta L_i^B\}$, wherein $\Delta L_i^B$ is the set of three-dimensional coordinates of the laboratory $L_i^B$ of Bob's agent $B_i$, and wherein the values of $h_i > 0$ and $v_i > 0$ are chosen by Alice and Bob in order to satisfy that the output spacetime regions $R_0, R_1, \ldots, R_{m-1}$ are pairwise spacelike separated, for $i \in \{0, 1, \ldots, m-1\}$.

In Step 904, within her laboratory $L^A$, Alice's agent A generates random numbers r, s $\in \{0, 1\}^n$ in the past of the spacetime point P=(0, 0, 0, 0).

In Step 906, agent A uses the numbers r and s to prepare n qubits in Bennett-Brassard 1984 (BB84) quantum states, where the number s indicates on which bases the states of the qubits are prepared, and where r indicates the encoded outcomes. The prepared state for the n-qubits system is denoted by $|\omega_r^s\rangle$. This state encodes the number r in the basis labeled by s.

In Step 908, the qubits are transmitted to the laboratory $L^B$ of Bob's agent B.

In Step 910, r and s are sent to agent $A_i$, through a secure classical channel by agent A. Alternatively, if, at the moment of sending the messages, agent A has the input $x_i$, $t_i = r \oplus x_i$ (with "$\oplus$" denoting bit-wise sum modulo 2) may be sent, rather than r.

In Step 912, the input or message $x_i$ is obtained by agent A, if it is not already available. $x_i$ may be obtained by generating $x_i$ (e.g., if $x_i$ is a random number), or by retrieving it from elsewhere, e.g., from a database.

In Step 914, $t_i = r \oplus x_i$ is computed by agent $A_i$. r is received from agent A in the past of the spacetime point $Q_i = (h_i, \vec{v}_i)$, where $\vec{v}_i \in \Delta L_i^B$, i.e., $Q_i$ is a spacetime point of $R_i$, for $i \in \{0, 1, \ldots, m-1\}$. The computation of $t_i$ may be unnecessary if agent A has provided $t_i$ rather than r.

In Step 916, Alice's agent $A_i$ sends s and $t_i$ to Bob's agent $B_i$ through a classical channel. The sending occurs at a spacetime point such that the messages arrive at the laboratory $L_i^B$ slightly in the past of the spacetime point $Q_i$, for $i \in \{0, 1, \ldots, m-1\}$. In particular, the transmission of s from $L_i^A$ to $L_i^B$, must begin after the time $\tau_i'$, which is the greatest time at which a light signal following any null curve in spacetime can leave the laboratory $L_i^A$ and reach another laboratory $L_k^B$ at, or before, the time $h_k + v_k$, for all $k \neq i$ with i, k∈{0, 1, ..., m−1}. This means that the spacetime event consisting in the transmission of s from $L_i^A$ to $L_i^B$ is not causally connected to any spacetime point of any output spacetime region $R_k$, for all k≠i with i, k∈{0, 1, ..., m−1}.

Turning to FIG. 9B, the steps by party B to perform the method for SCOT are shown. The steps are performed in conjunction with the steps of FIG. 9A.

In Step 950, party B's (Bob) agents B, $B_0$, $B_1$, ..., $B_{m−1}$ synchronize to a reference frame F in a spacetime that is at least approximately Minkowski. An equivalent step is performed by party A's agents A, $A_0$, $A_1$, ..., $A_{m−1}$, as previously described below in Step 900 of FIG. 9A.

In Step 952, party A's and party B's agents agree on m output spacetime regions $R_0$, $R_1$, ..., $R_{m−1}$ having the property of being spacelike separated, i.e., with no causal curve in spacetime connecting $R_i$ with $R_k$, for any pair of different numbers i, k, from the set {0, 1, ..., m−1}. As said above, in the description of Step 902 of FIG. 9A, in this embodiment, we consider that $R_i$={(t, x, y, z)|$h_i$≤t≤$h_i$+$v_i$, (x, y, z)∈$\Delta L_i^B$}, wherein $\Delta L_i^B$ is the set of three-dimensional coordinates of the laboratory $L_i^B$ of Bob's agent $B_i$, and wherein the values of $h_i$ and $v_i$ are chosen by Alice and Bob in order to satisfy that the output spacetime regions $R_0$, $R_1$, ..., $R_{m−1}$ are pairwise spacelike separated, for i∈{0, 1, ..., m−1}.

In Step 954, the selector input b∈{0, 1, ..., m−1} is obtained in the past of the spacetime point P=(0, 0, 0, 0) by Agent B.

In Step 956, the qubits are received by the laboratory $L^B$ of Bob's agent B, with reception occurring near the spacetime point P=(0, 0, 0, 0) (as previously discussed with reference to the system shown in FIG. 1, the set of spatial coordinates for the laboratory $L^B$ is assumed to include the origin (0, 0, 0), in the frame F). Based on Bob's input b, B redirects immediately after reception, the quantum state of the received qubits to the laboratory $L_b^B$ of Bob's agent $B_b$ through a secure quantum channel. Agent B does, thus, not require a quantum memory. The reception of the quantum state occurs near the spacetime point $Q_b$=($h_b$, $\vec{v}_b$).

In Step 958, s and $t_b$=r⊕$x_b$, are received by Agent $B_b$ from Agent $A_b$ slightly in the past of the spacetime point $Q_b$.

In Step 960, immediately after reception of s in his laboratory $L_b^B$, Bob's agent $B_b$ sets up the quantum measurement device within $L_b^B$ to measure the approaching n-qubits system in the basis labeled by s, on which it was initially prepared by Alice's agent A. The n-qubits system arrives to the laboratory $L_b^B$ near the spacetime point $Q_b$ and is then measured in the basis s, giving as outcome a number r'. Ideally, if there were not any errors in the implementation, the outcome r' would be exactly equal to the number r encoded by Alice's agent A, but in practice r' will be only approximately equal to r.

In Step 962, using r' and the message $t_b$=$x_b$⊕r received from agent $A_b$, agent $B_b$ computes $y_b$=r' ⊕$t_b$, which equals $x_b$ or is close to $x_b$, and outputs it in the output spacetime region $R_b$.

In the above described methods, various parameters, including the parameters δ, $\alpha_i$, $\beta_i$, and $\epsilon_i$ for i∈{0, 1, ..., m−1}, may be chosen in advance by Alice and Bob, together with the output spacetime regions $R_0$, $R_1$, ..., $R_{m−1}$, by considering the functioning of the devices within their laboratories, the precision of their atomic clocks, and the functioning of their quantum channels. In particular, the speed at which the quantum states are transmitted depends on the type of quantum channels used. For example, if the quantum systems encoding the qubits are photons, the quantum channels can be, for example, optical fibers through which the photons are transmitted, or they may be free space links, for example; the transmission of the quantum systems being slower in the former case than in the latter case.

The subsequent discussion shows that the method to implement SCOT described above in FIGS. 9A and 9B is unconditionally secure, with the security based on the physical principles of quantum theory and relativity. A variety of cheating strategies are subsequently discussed.

First, a dishonest Alice could try to perform some cheating strategy that deviates from her actions described above in order to guess Bob's input b somewhere in spacetime. However, in the method described above, Bob does not give any physical systems to Alice, the laboratories of Bob's agents and the quantum channels among them are secure. Thus, independently of Alice's actions, no information about Bob's input b can escape from Bob's laboratories to Alice's laboratories. This means that Alice cannot obtain any information on b, or in other words, the probability that Alice guesses b equals the probability of a random guess, which is 1/m, anywhere in spacetime. Thus, the SCOT method is unconditionally secure against Alice.

Second, a dishonest Bob could perform a cheating strategy that deviates from his actions described above in order to obtain l messages $x_{i_1}$, $x_{i_2}$, ..., $x_{i_l}$, with 2≤l≤m, in their respective output spacetime regions $R_{i_1}$, $R_{i_2}$, ..., $R_{i_l}$, l different numbers $i_1$, $i_2$, ..., $i_l$∈{0, 1, ..., m−1}. However, for any cheating strategy performed by Bob, the probability $p_n$ that he obtains $x_{i_1}$ in $R_{i_1}$, $x_{i_2}$ in $R_{i_2}$, ..., $x_{i_l}$ in $R_{i_l}$ decreases exponentially with the number of qubits n, as $$p_n \leq \left(\frac{1}{2} + \frac{1}{2\sqrt{2}}\right)^n, \quad (2)$$

for any l with 2≤l≤m. Thus, the described SCOT method is unconditionally secure against Bob. Eq. (2) indicates that Alice and Bob must agree in advance on a value of n that is large enough in order to guarantee a desired level of security.

Next, it is shown that the security of the SCOT method, as represented by Eq. (2), follows from the laws of quantum physics and relativity. In a general cheating strategy by Bob, Bob's goal is that his agent $B_{i_k}$ obtains r in $R_{i_k}$ from which he can compute $x_{i_k}$ using the number $t_{i_k}$=r⊕$x_{i_k}$ received from Alice's agent $A_{i_k}$, for k∈{1, 2, ..., l}. The probability that these l agents succeed in obtaining r in the corresponding output spacetime regions cannot be greater than the probability that any two of these agents succeed in obtaining r in the corresponding output spacetime regions. Thus, for simplicity, one may consider the case that only two agents try to cheat, say $B_0$ and $B_1$ try to guess r in $R_0$ and $R_1$, respectively. In other words, showing that Eq. (2) holds for the case m=2, which corresponds to l=2, implies that Eq. (2) holds for the general case m≥2 and 2≤l≤m. A complete mathematical security proof for the case m=2 is given in Pitalúa-García, where it is shown that Eq. (2) holds for the case m=2. Below the main physical arguments that lead to this security proof are provided.

In a cheating strategy by Bob, Bob's agent B may try, for example, to copy the received quantum state and send one copy to his agent $B_0$ and another copy to his agent $B_1$, who receiving these copies near the respective spacetime points $Q_0$ and $Q_1$ could then proceed to obtain the number r in $R_0$ and in $R_1$, by measuring the copied quantum states in the basis labeled by s on which Alice's agent A initially prepared the quantum state, and then output $x_0$ in $R_0$ and $x_1$ in $R_1$, respectively. However, this cheating strategy cannot succeed with high probability because the no-cloning theorem of quantum physics states that unknown quantum states cannot be cloned perfectly. In fact, whatever copies Bob send to his agents, their fidelity with respect to the original state will decrease exponentially with the number of qubits n, leading to a success probability $p_n$ that satisfies Eq. (2).

In another cheating strategy that Bob may perform, Bob's agent B applies a quantum measurement on the received n-qubits system near the spacetime point P in order to obtain a guess of the encoded number r. Bob's agent B sends this guess of r to his agents $B_0$ and $B_1$, who receive these messages near the spacetime points $Q_0$ and $Q_i$, respectively. Then, using the messages received from agents B and $A_i$ near the spacetime point $Q_i$, Bob's agent $B_i$ outputs his guess of $x_i$ in $R_i$, for i∈{0, 1}. This cheating strategy cannot succeed with high probability because the BB84 quantum states have the physical property that they cannot be distinguished with unit probability if the basis on which they are prepared is unknown. Thus, the probability that Bob's agent B decodes r correctly by measuring the n-qubits system received from Alice's agent A cannot be unity, and in fact satisfies the bound of Eq. (2), leading to a success probability $p_n$ for this cheating strategy that also satisfies Eq. (2).

More generally, in an arbitrary cheating strategy by Bob, since the spacetime regions $R_0$ and $R_1$ at which Bob's agents $B_0$ and $B_1$ must produce their outputs are spacelike separated, and since the transmission of s from Alice to Bob near the spacetime point $Q_0$ in $R_0$ ($Q_1$ in $R_1$) is spacelike separated from $R_1$ ($R_0$), it follows from the causality of spacetime that $B_0$ and $B_1$ must obtain their guess of r from quantum measurements on disjoint systems, which could have only interacted in the intersection of the causal past of some spacetime point in $R_0$ and some spacetime point in $R_1$. This means that in a general cheating strategy by Bob, Bob's agent B applies an arbitrary quantum operation on the received n-qubits system together with some extra ancillary quantum systems near the spacetime point P; agent B then partitions the total system into 2 subsystems, which can be in an arbitrary quantum entangled state, and distribute these systems to his agents $B_0$ and $B_1$, who receive them near the spacetime points $Q_0$ and $Q_1$, respectively; then, agents $B_0$ and $B_1$ apply quantum measurements on the received systems using the number s, which indicates the basis on which the initial quantum state was prepared by Alice's agent A, in order to obtain guesses of r and then output the corresponding guesses of the messages $x_0$ in $R_0$ and $x_1$ in $R_1$, respectively. However, a physical property of quantum physics, called the monogamy of quantum entanglement, states that if a first and a second quantum systems are in a quantum state that is highly entangled then a third quantum system cannot be very entangled to the first and second systems. This property implies that if the outcome of a quantum measurement on a quantum system held by Bob's agent $B_0$ ($B_1$) is highly correlated with the number r encoded by Alice's agent A in the original n-qubits system prepared by her, then the outcome of a quantum measurement applied by Bob's agent $B_1$ ($B_0$) on a quantum system held by him cannot be highly correlated to r. In other words, the probability that both agents $B_0$ and $B_1$ guess r cannot be very high, and in fact it decreases exponentially with n, as given by Eq. (2).

In practice, the preparation, transmission and measurement of the BB84 states, as discussed with reference to FIGS. 9A and 9B, may include several experimental challenges, which have been addressed in the academic literature in relation to the implementation of quantum key distribution using the BB84 states. An important experimental problem in quantum key distribution based on the BB84 protocol, which also applies to the method to implement SCOT for the embodiment described by FIGS. 9A and 9B, is that there is some small probability q>0 that the quantum state source produces a system of more than 1 qubit, when a single qubit preparation is intended. For example, in the case that the quantum systems encoding the qubits are photons, the quantum state source is a laser whose intensity is attenuated in order to produce pulses that, ideally, contain a single photon. However, in practice, there is a small probability q that a laser pulse produces two or more photons. This means that after receiving a multiple photon pulse, Bob can distribute these multiple photons to several of his agents near the output spacetime regions. Thus, for the repeated qubits, Bob is able to obtain the corresponding bits of Alice's input messages in more than one output spacetime region. This means that Bob may be able to obtain, for example, $x_0$ in $R_0$ and $x_1$ in $R_1$, with a probability $p_n'$ that can be slightly greater than the bound given by Eq. (2). However, this is not a problem for the security of the SCOT method in accordance with one or more embodiments of the invention because for q sufficiently small, $p_n'$ is smaller than unity for all values of n, and $p_n'$ decreases exponentially with n.

Turning to FIG. 10, a flowchart including steps implementing a verification of a SCOT, in accordance with one or more embodiments of the invention, is shown. The SCOT method of this invention may allow for a small error in Bob's output, and a determination may need to be made, regarding whether the error is acceptable.

In practice, there may be errors during the preparation, transmission and measurement of the quantum state $|\psi_r^s\rangle$. This implies that Bob's agent $B_b$ does not obtain the value of r perfectly, but an approximate number r'. As a way of example, below we consider embodiments of the SCOT method in which the number r is a string of n bits and the encoding $t_i$ of Alice's agent $A_i$ using r is given by $t_i=x_i \oplus r$, where '⊕' denotes bit-wise sum modulo 2, for i∈{0, 1, . . . , m−1}. In these embodiments, Bob's agent $B_b$ obtains a string r' of n bits, which is approximately equal to r. Thus, Bob obtains some output $y_b=r' \oplus t_b$, which differs from $x_b$ in the bit entries in which r' and r differ. The number of bit entries d(a', a) in which the n-bit strings a' and a differ is denoted the Hamming distance between a' and a. Taking into account the experimental errors of their devices and quantum channels, Alice and Bob may agree on some small threshold γ>0, for which they can guarantee that d(r', r)≤γn, which implies that d($y_b$, $x_b$)≤γn, since d($y_b$, $x_b$)=d(r', r). If γ is sufficiently small, then security against a dishonest Bob can still be guaranteed. For γ>0, security against Bob means that the probability that Bob obtains a n-bits string $y_i$ in $R_i$ satisfying d($y_i$, $x_i$)≤γn and also a n-bits string $y_k$ in $R_k$ satisfying d($y_k$, $x_k$)≤γn goes to zero as some security parameter, n in this case, goes to infinity, for any pair of different numbers i and k from the set {0, 1, . . . , m−1}. For example, it is shown in Pitalúa-García that for γ<0.015, security against Bob is guaranteed for the embodiments of the SCOT method described in FIGS. 9A and 9B.

The SCOT method, in accordance with one or more embodiments of the invention, may include a method to verify whether Bob has output the message $x_i$, or a message $y_i$ that is close enough to $x_i$ according to a previously agreed threshold, in the output spacetime region $R_i$, for i∈{0, 1, . . . , m−1}. The verification may be performed as follows.

Turning to FIG. 10, a verification method for SCOT, in accordance with one or more embodiments of the invention, is shown. The method may be executed by m verification devices $C_i$, for $i \in \{0, 1, \ldots, m-1\}$. As a way of example, the verification method illustrated in FIG. 10 considers embodiments of the SCOT method in which the input message $x_i$ of Alice's agent $A_i$ and the output $y_i$ of Bob's agent $B_i$ are strings of n bits, and where a threshold agreed to a priori by Alice and Bob for determining that $y_i$ is sufficiently close to $x_i$ is set to the Hamming distance $d(y_i, x_i)$ between $y_i$ and $x_i$ being not larger than $n\gamma$ for a small positive number $\gamma<1$ agreed to a priori by Alice and Bob, for $i \in \{0, 1, \ldots, m-1\}$.

In Step 1000, the message $x_i$ from Alice is obtained by the verification device $C_i$ at the intersection of the causal pasts of the spacetime points in $R_i$. Further, the message $y_i$ from Bob is obtained by the verification device $C_i$ in some spacetime region $R_i'$.

In Step 1002, a determination is made about whether $y_i$ was received within the time interval $\Delta\tau_i$ to ensure that the spacetime region $R_i'$ is part of the spacetime region $R_i$. If $y_i$ is found to be outside the time interval $\Delta\tau_i$, the method may proceed to Step 1004.

In Step 1004, a determination is made about whether $y_i$ is sufficiently close to $x_i$ based on a threshold agreed to a priori by Alice and Bob. If $y_i$ is found to be beyond the threshold, the method may proceed to Step 1006.

In Step 1006, the internal state of $C_i$ is set to "incorrect", and in Step 1008, the internal substrate is set to "output region incorrect & message incorrect".

Returning to Step 1004, if a determination is made that $y_i$ does not exceed the threshold, the method may proceed to Step 1010.

In Step 1010, the internal state of $C_i$ is set to "incorrect", and in Step 1012, the internal substrate is set to "output region incorrect & message correct".

Returning to Step 1002, If $y_i$ is found to be within the time interval $\Delta\tau_i$, the method may proceed to Step 1014.

In Step 1014, a determination is made about whether $y_i$ is sufficiently close to $x_i$ based on a threshold agreed to a priori by Alice and Bob. If $y_i$ is found to be beyond the threshold, the method may proceed to Step 1016.

In Step 1016, the internal state of $C_i$ is set to "incorrect", and in Step 1018, the internal substrate is set to "output region correct & message incorrect".

Returning to Step 1014, if a determination is made that $y_i$ does not exceed the threshold, the method may proceed to Step 1020.

In Step 1020, the internal state is set to "correct".

Multiple variations of the above described systems and methods in accordance with one or more embodiments of the invention exist. For example, information may be encoded in qubits implemented in quantum systems in various ways, including the polarization degrees of freedom of photons, the time-bin degrees of freedom of photons, or the spin degrees of freedom of electrons, atoms, nucleus, molecules, etc. Further, while the above described systems and methods do not rely on quantum memory, alternatives that include quantum memories may be implemented without departing from the invention. Alice's and Bob's laboratories may contain quantum memories, which allow the generated quantum states by Alice to be stored in Alice's and Bob's laboratories at different steps of the above described method. The use of quantum memory may, thus, enable implementations with flexibility regarding the time of reception of the message s by Bob's agent $B_b$ in his laboratory $L_b^B$, for $b \in \{0, 1, \ldots, m-1\}$, as in this case, Bob's agent $B_b$ can store the received quantum state until s is received and then the quantum measurement device within his laboratory is set to measure the stored quantum state in the basis labeled by s. Further, the use of quantum memories in Alice's and Bob's laboratories may enable embodiments in which the respective numbers of Alice's and Bob's agents can be reduced from m+1 to m, by setting Alice's and Bob's respective agents A and B to be the respective agents $A_0$ and $B_0$, for example, where the step of the transmission of the quantum state from Alice's agent A to Bob's agent B and then to Bob's agent $B_0$ in the embodiment described above is replaced by a step in which agent $B_0$ receives the quantum state from agent $A_0$ and then stores the quantum state in his laboratory until the spacetime region $R_0$, where it is measured.

In one or more embodiments of the invention, some or all of Alice's and Bob's laboratories may be moving in the reference frame F. In these embodiments, the laboratories may have GPS devices that allow the laboratories to track their locations. The various steps of the method to implement SCOT of the above described method can be straightforwardly adapted for embodiments in which the laboratories are moving. These embodiments include, for example, the case in which all or some of the laboratories are installed in satellites orbiting the Earth, and in which some other laboratories are fixed on the surface of the Earth. Finally, one or more embodiments of the invention may be designed to be suitable for use under general curved spacetime conditions, i.e., where Minkowski may not serve as a reasonable approximation. To operate under curved spacetime, the curvature of spacetime must be considered by Alice and Bob when agreeing on the output spacetime regions $R_0$, $R_1$, $\ldots$, $R_{m-1}$ and the spacetime points $Q_0, Q_1, \ldots, Q_{m-1}$ where Alice's agents communicate the basis s to Bob's agents, in order to guarantee that no signal leaving from the spacetime region $R_i$, and in particular from the spacetime point $Q_i$, can arrive to the spacetime region $R_k$, for all $k \neq i$ with i, $k \{0, 1, \ldots, m-1\}$.

The method of spacetime constrained oblivious transfer (SCOT), in accordance with one or more embodiments of the invention is applicable when a party Bob wants to learn an entry of a database from another party Alice, in some region of spacetime, while keeping his entry choice private from Alice, and by guaranteeing to Alice that only one entry of her database is accessible to Bob in the corresponding spacetime region. SCOT may be useful in situations where Bob must learn the information within specific locations and within specific short time intervals. For example, in high frequency trading, it is very important to learn information on the market on real time. Another example corresponds to situations where Alice and Bob own moving objects and they want to keep their locations and trajectories secret from the other party, however, some information on their future trajectories must be disclosed in some situations, for example, if there is danger of collision.

The use case scenario described below is intended to provide an example of the method spacetime constrained oblivious transfer. The described methods and system are not limited to the use case scenario.

One application of SCOT is related to the avoidance of satellite collisions. In the use case scenario, assume that the owners of two satellites want to keep their satellite trajectories secret while avoiding collisions of the satellites.

Consider that Bob owns a satellite that, within a short interval of time $\Delta\tau$ is in one of m locations. Alice owns another satellite. Alice and Bob perform a SCOT protocol. Bob inputs an integer number b having one of m possible values. Each possible value of b may indicate, for example, a continuous region of three-dimensional space where Bob's satellite could be within the time interval $\Delta\tau$, or it could indicate a trajectory within the time interval $\Delta\tau$ or within a longer time interval. Consider for now that b indicates a continuous region of three-dimensional space $\Delta L_b^B$ where Bob's satellite could be within the time interval $\Delta\tau$, for $b \in \{0, 1, \ldots, m-1\}$. Alice inputs m messages $x_0, x_1, \ldots, x_{m-1}$ of n bits. We consider here that the output spacetime region $R_j$ of the SCOT protocol, in the frame F agreed by Alice and Bob, is the continuous region of three dimensional space $\Delta L_j^B$ at time interval $\Delta\tau'$, which is slightly in the past of time interval $\Delta\tau$, for $j \in \{0, 1, \ldots, m-1\}$. We take each of the pairs from the locations $\Delta L_0^B, \Delta L_1^B, \ldots, \Delta L_{m-1}^B$, to be sufficiently far apart and $\Delta\tau'$ sufficiently small so that the spacetime regions $R_0, R_1, \ldots, R_{m-1}$ are pair-wise spacelike separated. We take $\Delta\tau'$ to be slightly in the past of $\Delta\tau$.

If the trajectory of Alice's satellite is programmed to pass by $\Delta L_k^B$ in the future of $\Delta\tau'$, within the time interval $\Delta\tau$, then Alice's input $x_k$ indicates its planed trajectory for the time interval $\Delta\tau$ (with the precision of the trajectory increasing with the number of bits n). The other inputs $x_j$ with $j \neq k$ and $j, k \in \{0, 1, \ldots, m-1\}$ may be the string $(0, 0, \ldots, 0)$ or random and independent strings. Alice's satellite sends the encoding of her input $x_k$ to the region of three-dimensional space $\Delta L_k^B$ so that it arrives just before the beginning of the time interval $\Delta\tau$, i.e., within a time interval $\Delta\tau'$, which is slightly in the past of $\Delta\tau$. If Bob's input is b=k then Bob's satellite receives Alice's encoding messages s and $t_b$ and can thus decodes the value of $x_k$, since Bob has input b=k. Thus, Bob's satellite can then adapt its trajectory for the time interval $\Delta\tau$ to avoid collision with Alice's satellite.

In the described scenario, various security conditions are met, providing security against Alice and security against Bob, as subsequently discussed.

In the described scenario, Alice never learns Bob's input b, as this is a property satisfied by the SCOT method in accordance with one or more embodiments of the invention. Alice, thus, never knows in which of the in locations $\Delta L_0^B, \Delta L_1^B, \ldots, \Delta L_{m-1}^B$ Bob's satellite is within the time interval $\Delta\tau$.

Bob learns the message $x_b$ of his choice within the corresponding spacetime region $R_b$, i.e., within the continuous region of three dimensional space $\Delta L_b^B$ at time interval $\Delta\tau'$. However, Bob cannot learn $x_1$ in $R_j$ for any other $j \neq b$, for $j \in \{0, 1, \ldots, m-1\}$. Accordingly, Bob's satellite learns Alice's satellite future trajectory for the time interval $\Delta\tau$ only if there is risk of collision, that is, if b=k. In principle, Bob could learn the trajectory of Alice's satellite even if $b \neq k$, but Bob would not be able to learn this in the spacetime region $R_b$, that is at the location $\Delta L_b^B$ at time interval $\Delta\tau'$. Bob could learn the trajectory of Alice's satellite for the time $\Delta\tau$ only in the future, after the time interval $\Delta\tau'$, but in order to do so, Bob may need to have many more satellites being able to receive Alice's messages $x_1$ and then send these to a common satellite or Bob's ground receptor. This could be impractical for a large m, in which case the trajectory of Alice's satellite for the time $\Delta\tau$ remains secret (except if b=k).

Alternatively, if Bob has resources in space that are sufficiently powerful to allow him to recover all signals emitted by Alice's satellite, and hence decode its trajectory for the time interval $\Delta\tau$, Bob could only do this at times after the time $\Delta\tau'$. For example, if $\Delta\tau'=1$ ms, the spatial separation between the three-dimensional space regions $\Delta L_j^B$ and $\Delta L_i^B$ needs to be at least 300 km, for $j \neq i$ and $i,j \in \{0, 1, \ldots, m-1\}$. Accordingly, in this case, Bob can learn the past trajectory of Alice's satellite, with a delay of at least 1 ms, but Bob cannot learn its future trajectory. As mentioned before, in order to learn the trajectory of Alice's satellite with a delay of 1 ms, Bob would need to be able to recover the signal from Alice's satellite almost immediately after its transmission, which might not be practical for Bob, unless Bob has satellites at all locations $\Delta L_0^B, \Delta L_1^B, \ldots, \Delta L_{m-1}^B$, or Bob's satellite is following Alice's satellite, hence it is always close to Alice's satellite. Thus, in practical scenarios where this would not happen, Bob does not even learn the past trajectory of Alice's satellite. Instead, Bob only learns its future trajectory for the time interval $\Delta\tau$ in case that there is risk of collision.

The above use case may be generalized by repeatedly performing the method several times after each time interval $\Delta\tau$ to make the method available for large continuous time intervals. The use case may further be extended for the case in which Alice and Bob have several satellites. For example, if Alice has $N_A < m$ satellites and Bob has $N_B < m$ satellites, the SCOT method could be extended such that Bob inputs $N_B$ numbers from the set $\{0, 1, \ldots, m-1\}$, indicating the locations of his satellites. $N_A$ of the m inputs $x_0, x_1, \ldots, x_{m-1}$ by Alice may be such that they indicate the future trajectories of Alice's satellites for the time interval $\Delta\tau$.

Embodiments of the invention may be implemented on a computing system. Any combination of mobile, desktop, server, router, switch, embedded device, or other types of hardware may be used. For example, as shown in FIG. 11.1, the computing system (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), and numerous other elements and functionalities.

The computer processor(s) (1102) may be an integrated circuit for processing instructions. For example, the computer processor(s) may be one or more cores or micro-cores of a processor. The computer processor(s) may further be a field programmable gate array (FPGA) or an application specific integrated circuit (ASIC). The computer processor may further be a system on a chip that may include components in addition to the processor, such as memory, I/O interfaces, etc. The computing system (1100) may also include one or more input devices (1110), such as a touchscreen, keyboard, mouse, microphone, touchpad, electronic pen, or any other type of input device.

The communication interface (1112) may include an integrated circuit for connecting the computing system (1100) to a network (not shown) (e.g., a local area network (LAN), a wide area network (WAN) such as the Internet, mobile network, or any other type of network) and/or to another device, such as another computing device.

Further, the computing system (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (1100) in FIG. 11.1 may be connected to or be a part of a network. For example, as shown in FIG. 11.2, the network (1120) may include multiple nodes (e.g., node X (1122), node Y (1124)). Each node may correspond to a computing system, such as the computing system shown in FIG. 11.1, or a group of nodes combined may correspond to the computing system shown in FIG. 11.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1100) may be located at a remote location and connected to the other elements over a network.

Although not shown in FIG. 11.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1122), node Y (1124)) in the network (1120) may be configured to provide services for a client device (1126). For example, the nodes may be part of a cloud computing system. The nodes may include functionality to receive requests from the client device (1126) and transmit responses to the client device (1126). The client device (1126) may be a computing system, such as the computing system shown in FIG. 11.1. Further, the client device (1126) may include and/or perform all or a portion of one or more embodiments of the invention.

The computing system or group of computing systems described in FIGS. 11.1 and 11.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 11.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 11.1, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 11.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 11.1 may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 11.1 and the nodes and/or client device in FIG. 11.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing spacetime-constrained oblivious transfer between a party A and a party B, the method comprising:
   synchronizing a plurality of agents A, B, $A_i$, $B_i$ to a common reference frame F in a spacetime that is at least approximately Minkowski,
      wherein $i \in \{0, 1, \ldots, m-1\}$,
      wherein m corresponds to a cardinality of a plurality of messages $x_i$ from which spacetime-constrained oblivious transfer is to be performed,
      wherein the agents A and $A_i$ of the plurality of agents are associated with the party A, and
      wherein the agents B and $B_i$ of the plurality of agents are associated with the party B;
   specifying output spacetime regions $R_0$, $R_1$, . . . , $R_{m-1}$,
      wherein no connection by a causal curve in spacetime exists for any pair of output spacetime regions selected from the output spacetime regions $R_0$, $R_1$, . . . , $R_{m-1}$;
   generating random numbers $r \in \Omega_{outcome}$ and $s \in \Omega_{basis}$ by the agent A,
      wherein different elements s of a set $\Omega_{basis}$ label different orthogonal bases of a Hilbert space, and
      wherein, for any fixed $s \in \Omega_{basis}$, different elements r of a set $\Omega_{outcome}$ label different orthogonal quantum states $|\psi_r^s\rangle$ from an orthogonal basis s;
   generating a quantum state $|\psi_r^s\rangle$ of a quantum system, by the agent A;
   transmitting the quantum state to the agent B, by the agent A;
   transmitting the random numbers r and the random numbers s to the agent $A_i$, by the agent A, wherein $i \in \{0, 1, \ldots, m-1\}$;
   obtaining an associated message $x_i \in \Omega_{outcome}$ by the agent $A_i$, wherein $i \in \{0, 1, \ldots, m-1\}$;
   encoding, by the agent $A_i$, the plurality of messages $x_i$ using the random numbers r to obtain an encoded $t_i$, wherein $i \in \{0, 1, \ldots, m-1\}$;
   transmitting, by the agent $A_i$, the encoded $t_i$ and the random numbers s to the agent $B_i$ at a spacetime point that is in the causal past of at least one spacetime point of an output spacetime region $R_i$ and that is not causally connected to any spacetime point of output spacetime region $R_k$ for any $k \in \{0, 1, \ldots, m-1\}/\{i\}$, wherein $i \in \{0, 1, \ldots, m-1\}$;
   obtaining, by the agent B, a selector input $b \in \{0, 1, \ldots, m-1\}$;
   forwarding, by the agent B, the quantum state to an agent $B_b$;
   measuring, by the agent $B_b$, the quantum state in the orthogonal basis s to obtain outcome $r' \in \Omega_{outcome}$;
   and computing a received message $y_b \in \Omega_{outcome}$ by decoding an encoded $x_b$ using r' and $t_b$, in output spacetime region $R_b$.

2. The method of claim 1, wherein obtaining the selector input b is performed in a spacetime region G, wherein the spacetime region G is the intersection of causal pasts of all spacetime points of all of the output spacetime regions $R_0$, $R_1$, . . . , $R_{m-1}$.

3. The method of claim 1, wherein obtaining, by the agent $A_i$, the associated message $x_i$ is performed in an associated spacetime region $E_i$, wherein the associated spacetime region $E_i$ is the intersection of causal pasts of all spacetime points of the output spacetime region $R_i$, and wherein $i \in \{0, 1, \ldots, m-1\}$.

4. The method of claim 1, wherein the received message $y_b$ differs no more than a specified threshold from $x_b$.

5. The method of claim 1, wherein the common reference frame F in the spacetime that is at least approximately the Minkowski applies in at least one selected from a group consisting of Earth's surface, regions near the Earth's surface, and Earth orbits of satellites.

6. The method of claim 1,
   wherein $\Omega_{outcome} = \{0, 1\}^n$;
   wherein then is a specified natural number;
   wherein encoding the associated message $x_i$ using the random numbers r comprises an operation $t_i = x_i \otimes r$;
   wherein decoding the encoded $x_b$ using r' comprises an operation $y_b = t_b \lfloor r' \rfloor$;
   and wherein the '$\otimes$' denotes bit-wise sum modulo 2.

7. The method of claim 6, wherein the quantum state $|\psi_r^s\rangle$ is a tensor product of n qubit quantum states $|\psi_{r^j}^{s^j}\rangle$;
   wherein $j \in \{0, 1, \ldots, n-1\}$;
   wherein $\Omega_{basis} = \{0, 1\}^n$;
   wherein $r^j$ is the jth bit entry of the random numbers r;
   wherein $s^j$ is the jth bit entry of the random numbers s;
   wherein the orthogonal basis s corresponds to n-qubit basis in which a basis of the jth qubit is a qubit orthogonal basis $D_0$ if $s^j = 0$, or a qubit orthogonal basis $D_1$ if $s^j = 1$;
   wherein $D_0$ and $D_1$ are two qubit orthogonal bases that are not mutually orthogonal.

8. The method of claim 1, further comprising storing the quantum state by at least one of the plurality of agents A, B, $A_i$, $B_i$.

9. The method of claim 8, wherein storing the quantum state by at least one of the plurality of agents A, B, $A_i$, $B_i$ applies in at least one selected from a group consisting of storing the quantum state by the agent A before the quantum state is transmitted, storing the quantum state by the agent B before the quantum state is forwarded, and storing the quantum state by at least one of the plurality of agents A, B, $A_i$, $B_i$ before the quantum state is measured.

10. The method of claim 1, further comprising verifying whether a message $y_i$ obtained by the party B correctly represents the associated message $x_i$ provided by the party A, for $i \in \{0, 1, \ldots, m-1\}$, by:
   providing, by the party A, the associated message $x_i$ to a verification device $C_i$, at the intersection of the causal pasts of spacetime points in the output spacetime region $R_i$;

providing, by the party B, the message $y_i$ to the verification device $C_i$ in a spacetime region $R'_i$; and determining, by the verification device, whether the message $y_i$ correctly represents the associated message $x_i$.

11. The method of claim 10, wherein determining whether the message $y_i$ correctly represents the associated message $x_i$ comprises:

making a first determination that the spacetime region $R'_i$ is contained in the output spacetime region $R_i$;

making a second determination that the message $y_i$ is sufficiently close to the associated message $x_i$; and based on the first and the second determinations, concluding that the message $y_i$ correctly represents the associated message $x_i$.

12. The method of claim 10, wherein determining whether the message $y_i$ correctly represents the associated message $x_i$ comprises concluding that the message $y_i$ does not correctly represent the associated message $x_i$ based on one selected from a group consisting of:

making a first determination that $R'_i$ is contained in the output spacetime region $R_i$ and making a second determination that the message $y_i$ is not sufficiently close to the associated message $x_i$, making a first determination that $R'_i$ is not contained in the output spacetime region $R_i$ and making a second determination that the message $y_i$ is sufficiently close to the associated message $x_i$, and making a first determination that $R'_i$ is not contained in the output spacetime region $R_i$ and making a second determination that the message $y_i$ is not sufficiently close to the associated message $x_i$.

13. The method of claim 1 where the different elements s from the set $\Omega_{basis}$ label different bases that are mutually unbiased.

14. The method of claim 1, wherein at least one of the plurality of agents A, B, $A_i$, $B_i$ is a satellite orbiting the Earth.

15. A system for performing spacetime-constrained oblivious transfer between a party A and a party B, the system comprising:

a laboratory $L^A$, associated with the party A, the laboratory $L^A$ comprising:

a random number generator configured to generate random numbers $r \in \Omega_{outcome}$ and random numbers $s \in \Omega_{basis}$;

a quantum state source configured to generate quantum state $|\psi_r^s\rangle$, wherein different elements s of a set $\Omega_{basis}$ label different orthogonal bases of a Hilbert space, and wherein, for any fixed $s \in \Omega_{basis}$, different elements r of a set $\Omega_{outcome}$ label different orthogonal quantum states $|\psi_r^s\rangle$ from an orthogonal basis s;

a preparation device that is communicatively connected to a laboratory $L^B$ using a quantum channel, and configured to transmit the quantum state to the laboratory $L^B$; and a first communication module that is communicatively connected to a plurality of laboratories $L_0^A$, $L_1^A$, ... $L_{m-1}^A$ using a plurality of secure classical channels, and configured to transmit the random numbers r and the random numbers s to the plurality of laboratories $L_0^A$, $L_1^A$, ... $L_{m-1}^A$;

the plurality of laboratories $L_0^A$, $L_1^A$, ..., $L_{m-1}^A$, associated with the party A, wherein each laboratory $L_i^A$, $i \in \{0, 1, \ldots, m-1\}$, comprises:

a second communication module that is communicatively connected to laboratory $L^A$ using one of the plurality of secure classical channels, and that is communicatively connected to a laboratory $L_j^B$ of a plurality of laboratories $L_0^B$, $L_1^B$, ..., $L_{m-1}^B$ using a classical channel, and wherein the second communication module is configured to receive r and s;

a computing device configured to:

obtain a message $x_i \in \Omega_{outcome}$; and encode the message $x_i$ using r to obtain an encoded $t_i$; and wherein the second communication module is further configured to transmit the encoded $t_i$ and the random numbers s to laboratory $L_i^B$ using the classical channel;

the laboratory $L^B$, associated with the party B, comprising:

a redirection unit that is communicatively connected to laboratory $L^A$ using the quantum channel, and configured to receive the quantum state from laboratory $L^A$;

a computing device configured to obtain a selector input $b \in \{0, 1, \ldots, m-1\}$;

a quantum communication module that is communicatively connected to the plurality of laboratories $L_0^B$, $L_1^B$, ... $L_{m-1}^B$ using a plurality of secure quantum channels, wherein the quantum communication module is configured to forward the quantum state to laboratory $L_b^B$;

a laboratory $L_b^B$ of the plurality of laboratories a $L_0^B$, $L_1^B$, ..., $L_{m-1}^B$, associated with the party B, comprising:

a third communication module that is communicatively connected to laboratory $L_b^A$ using one of a plurality of classical channels, and configured to receive $t_b$ and s;

a quantum measurement device communicatively connected to laboratory $L^B$ using one of the plurality of secure quantum channels, and configured to measure the quantum state in basis s to obtain outcome $r' \in \Omega_{outcome}$; and a computing device configured to compute a received message $y_b \in \Omega_{outcome}$ by decoding an encoded $x_b$ using r' and $t_b$, in output spacetime region $R_b$;

wherein a plurality of laboratories $L^A$, $L^B$, $L_i^A$ and $L_i^B$ is synchronized to a common reference frame F in a spacetime that is at least approximately Minkowski, wherein $i \in \{0, 1, \ldots, m-1\}$, wherein m corresponds to a cardinality of a plurality of messages $x_i$ from which spacetime-constrained oblivious transfer is to be performed, and wherein output spacetime regions $R_0$, $R_1$, ..., $R_{m-1}$ are specified, wherein no connection by a causal curve in spacetime exists for any pair of output spacetime regions selected from the output spacetime regions $R_0$, $R_1$, ..., $R_{m-1}$, and wherein the transmission of the encoded $t_i$ and the random numbers s by laboratory $L_i^A$ occurs at a spacetime point that is in the causal past of at least one spacetime point of an output spacetime region $R_i$ and that is not causally connected to any spacetime point of output spacetime region $R_k$ for any $k \in \{0, 1, \ldots, m-1\}/\{i\}$, wherein $i \in \{0, 1, \ldots, m-1\}$.

16. The system of claim 15, wherein the plurality of classical channels and the plurality of secure classical channels comprise at least one selected from a group of electrical and optical network links.

17. The system of claim 15, wherein the quantum state is encoded in a quantum system represented by one selected from a group consisting of polarization degrees of freedom of photons, time-bin degrees of freedom of photons, spin degrees of freedom of electrons, spin degrees of freedom of atoms, spin degree of freedom of nucleus, spin degrees of freedom of molecules.

18. The system of claim 15, wherein each of the plurality of laboratories $L^A$, $L^B$, $L_i^A$ and $L_i^B$ comprises and atomic clock, used for synchronization to the common reference frame F.

19. The system of claim 15, further comprising a plurality of verification devices $C_0, C_1, \ldots, C_{m-1}$, wherein each of the plurality of verification devices $C_i$, with $i \in \{0, 1, \ldots, m-1\}$, is configured to verify whether a message $y_i$ obtained by the party B correctly represents the message $x_i$ provided by the party A, for $i \in \{0, 1, \ldots, m-1\}$, by:

obtaining, from laboratory $L_i^A$, the message $x_i$, at the intersection of the causal pasts of spacetime points in the output spacetime region $R_i$;

obtaining, from laboratory $L_i^B$, the message $y_i$ in a spacetime region $R'_i$; and determining, by the verification device, whether the message $y_i$ correctly represents the message $x_i$.

20. The system of claim 19, wherein determining whether the message $y_i$ correctly represents the message $x_i$ comprises:

making a first determination that the spacetime region $R'_i$ is contained in the output spacetime region $R_i$;

making a second determination that the message $y_i$ is sufficiently close to $x_i$; and based on the first and the second determinations, concluding that the message $y_i$ correctly represents the message $x_i$.

\* \* \* \* \*